United States Patent
Okamoto

(10) Patent No.: US 9,502,703 B2
(45) Date of Patent: Nov. 22, 2016

(54) LAMINATED MICROPOROUS FILM, BATTERY SEPARATOR, AND NON-AQUEOUS ELECTROLYTE BATTERY

(75) Inventor: Kazuhiro Okamoto, Miyagi (JP)

(73) Assignee: Sony Corporation, Tokyo (JP)

( * ) Notice: Subject to any disclaimer, the term of this patent is extended or adjusted under 35 U.S.C. 154(b) by 372 days.

(21) Appl. No.: 13/308,991

(22) Filed: Dec. 1, 2011

(65) Prior Publication Data

US 2012/0148901 A1 Jun. 14, 2012

(30) Foreign Application Priority Data

Dec. 8, 2010 (JP) ................. P2010-273873

(51) Int. Cl.
*H01M 2/14* (2006.01)
*H01M 2/16* (2006.01)
*H01M 2/18* (2006.01)
*H01M 10/0525* (2010.01)

(52) U.S. Cl.
CPC ............. *H01M 2/145* (2013.01); *H01M 2/166* (2013.01); *H01M 2/1686* (2013.01); *H01M 2/18* (2013.01); *H01M 10/0525* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 5,378,324 A * | 1/1995 | Hodgson | 205/619 |
| 7,807,286 B2 | 10/2010 | Hennige et al. | |
| 7,892,673 B2 | 2/2011 | Hennige et al. | |
| 2007/0048435 A1 * | 3/2007 | Suzuki et al. | 427/58 |
| 2011/0111305 A1 * | 5/2011 | Jeon et al. | 429/326 |

FOREIGN PATENT DOCUMENTS

| | | | | |
|---|---|---|---|---|
| JP | 2004-087228 | | 3/2004 | |
| JP | 2005-536658 | | 12/2005 | |
| WO | WO 2009022848 | * | 2/2009 | ............ H01M 10/36 |

OTHER PUBLICATIONS

JP, 2001-319634 (a raw machine translation) (Abstract, Detailed Description & Drawings) (Nov. 16, 2001).*

* cited by examiner

*Primary Examiner* — Miriam Stagg
*Assistant Examiner* — Carmen Lyles-Irving
(74) *Attorney, Agent, or Firm* — K&L Gates LLP

(57) ABSTRACT

A laminated microporous film including a base which is formed from a non-woven fabric, and a surface layer which is formed on at least one of the surfaces of the base and includes a resin material and inorganic particles, wherein variation in thickness which is expressed using a standard deviation is equal to or less than 2.5%.

18 Claims, 13 Drawing Sheets

LAMINATED MICROPOROUS FILM, BATTERY SEPARATOR, AND NON-AQUEOUS ELECTROLYTE BATTERY

CROSS REFERENCES TO RELATED APPLICATIONS

The present application claims priority to Japanese Priority Patent Application JP 2010-273873 filed in the Japan Patent Office on Dec. 8, 2010, the entire content of which is hereby incorporated by reference.

BACKGROUND

The present application relates to a microporous film with a laminate structure, and in more detail, relates to a laminated microporous film, which includes a base formed of a non-woven fabric and a surface layer, which includes inorganic particles and where a heating and pressurizing process has been carried out, and which is formed so that the entire thickness is uniform, a battery separator, and a non-aqueous electrolyte battery which uses the laminated microporous film and the battery separator.

In recent years, along with the spread of the use of portable information electronic apparatuses such as mobile phones, video cameras, laptop computers, higher performance, smaller sizes, and lighter weights of these apparatuses have been achieved. A disposable primary battery or a secondary battery which is able to be used repeatedly are used as the power sources of these apparatuses, but for excellent comprehensive balance in terms of higher performance, smaller sizes, lighter weights, and economy efficiency, the demand for secondary batteries, and in particular lithium ion secondary batteries is increasing. In addition, in these apparatuses, there has been further progress in terms of higher performance and lighter weights, and higher energy density is demanded in relation to lithium ion secondary batteries. In addition, due to the high energy density, lithium ion secondary batteries are also used as batteries mounted in electric power tools, electrically-powered bicycles, electric cars, hybrid cars, and the like.

In the case of being used in cars, harsh usage is assumed such as higher battery capacity, larger currents with regard to rapid charging and discharging, and repeatedly charging and discharging over a long period of time. In the past, in the secondary batteries which are mainly held in small apparatuses, a microporous film which is formed from polyolefin resin is adopted as a separator. Among these, safety is ensured by the polyolefin microporous film melting at approximately 130° C. and the porous holes being clogged, that is, by having a so-called shutdown function. Furthermore, in a laminated microporous film with polyethylene and polypropylene, it is possible that the melt-down temperature is increased due to the high melting point of polypropylene and high levels of safety are realized using a single layer film of polyethylene. However, in a case of an electric power tool and use in a car where large currents are used, the heat resistance of the polyethylene resin is insufficient and safety at higher temperatures is demanded and non-woven fabrics formed from materials with high melting points are often examined.

The non-woven fabric is used as a relatively cheap microporous film in a low-quality battery. However, in the manufacturing method, since unevenness in the thickness is large and pin holes are generated in an irregular manner, the adoption in secondary batteries has not begun in earnest. In addition, it may be pointed out that there is a drawback in that the mechanical characteristics of non-woven fabric are weak in the structure where microfibers are entwined.

In regard to the drawbacks of non-woven fabric, it has been disclosed that uniformity is possible in regard to the unevenness in thickness by performing a calendar process with regard to a surface of non-woven fabric as shown in Japanese Unexamined Patent Application Publication No. 2004-87228. On the other hand, there is no other measure for countering the generation of irregular pin holes which is solved by a single layer of non-woven fabric other than minimizing the probability of generation of the pin holes by increasing the amount of lamination of the microfibers and increasing thickness. It is not a desirable countermeasure as, while the number of holes is small, the existence of holes which may cause a short is not able to be permitted in terms of the safety of the battery and a thick separator acts against the higher performance of the battery.

In regard to this, in a separator which has a laminated structure using a non-woven fabric as a base, a method has been proposed where the pin holes are covered up by a PVdF resin layer which is included in inorganic particles being formed on the surface of the non-woven fabric as shown in Japanese Unexamined Patent Application Publication (Translation of PCT Application) No. 2005-536658. In addition, in regard to the insufficient mechanical characteristics, there is improvement by the PVdF being bonded with the microfibers of the non-woven fabric.

SUMMARY

However, in a case where a method such as in Japanese Unexamined Patent Application Publication (Translation of PCT Application) No. 2005-536658 is used, since the resin film traces the surface characteristics of the non-woven fabric, there is a concern that the surface characteristics of the surface after processing may have deteriorated and result in non-uniformity of the separator characteristics in a case where the resin film is formed on a non-woven fabric base where the surface characteristics have deteriorated (with large surface roughness).

It is desirable that a laminated microporous film is provided, which prevents generation of pin holes in a laminated separator using non woven fabric and has high mechanical characteristics, a battery separator, and a non-aqueous electrolyte battery.

A laminated microporous film and a battery separator according to an embodiment of the disclosure is provided with a base which is formed from a non-woven fabric and a surface layer which is formed on at least one of the surfaces of the base and includes a resin material and inorganic particles, and the variation in thickness which is expressed using a standard deviation is equal to or less than 2.5%.

In addition, a laminated microporous film and a battery separator according to another embodiment of the disclosure is provided with a base which is formed from a non-woven fabric and a surface layer which is formed on at least one of the surfaces of the base and includes a resin material and inorganic particles, and is formed by a pressurizing process being carried out on at least one of the surfaces of the surface layer.

In addition, a non-aqueous electrolyte battery according to still another embodiment of the disclosure is provided with a positive electrode, a negative electrode, a separator, and a non-aqueous electrolyte, where the separator is provided with a base which is formed from a non-woven fabric and a surface layer which is formed on at least one of the surfaces of the base and includes a resin material and inorganic particles, and the variation in thickness which is expressed using a standard deviation is equal to or less than 2.5%.

In addition, a non-aqueous electrolyte battery according to still another embodiment of the disclosure is provided with a positive electrode, a negative electrode, a separator, and a non-aqueous electrolyte, where the separator is provided with a base which is formed from a non-woven fabric and a surface layer which is formed on at least one of the surfaces of the base and includes a resin material and inorganic particles, and is formed by a pressurizing process being carried out on at least one of the surfaces of the surface layer.

In the laminated microporous film and the battery separator of the embodiments of the disclosure, it is possible to bury pin holes which are generated in an irregular manner by the surface layer being formed on the surface of the non-woven fabric base and to form the surface layer in a uniform manner by bonding the microfibers which constitute the non-woven fabric to each other. In addition, it is possible to achieve a process of making the surface layer uniform at the same time as increasing the fineness of the surface layer.

In addition, in the non-aqueous electrolyte battery of the embodiments of the disclosure, it is possible to improve the safety by using the separator as described above and to obtain uniformly high separator characteristics over an entire electrode.

According to the laminated microporous film and the battery separator of the embodiments of the disclosure, it is possible to realize uniformly high porous film characteristics over the entire film. In addition, the non-aqueous electrolyte battery of the embodiments of the disclosure is able to be appropriately used in the battery usages of being mounted in an electric power tool, an electrically-powered bicycle, an electric car, a hybrid car, and the like where high quality is demanded.

Additional features and advantages are described herein, and will be apparent from the following Detailed Description and the figures.

DETAILED DESCRIPTION

Below, the embodiments of the disclosure will be described. Here, the description will be performed as below.
1. First Embodiment (Example of Laminated Microporous Film of Disclosure)
2. Second Embodiment (Example of Battery Using Laminated Microporous Film of Disclosure)

1. First Embodiment

In a laminated microporous film according to a first embodiment, surface layers which include a resin material and inorganic particles are formed on both surfaces of a base which is formed from a non-woven fabric and a pressurizing process is carried out on the surface layers. The laminated microporous film is, for example, able to be used as a typical resin material film where heat resistance, resistance against oxidation, dimensional stability, and high mechanical strength, and the like is necessary, but is not limited to this. If the laminated microporous film satisfies necessary characteristics such as resistance with regard to an organic solvent, it is able to be used as a separator in a battery. Below, a laminated microporous film 1 of the disclosure will be described.

(1-1) Configuration of Laminated Microporous Film

Figure 1:
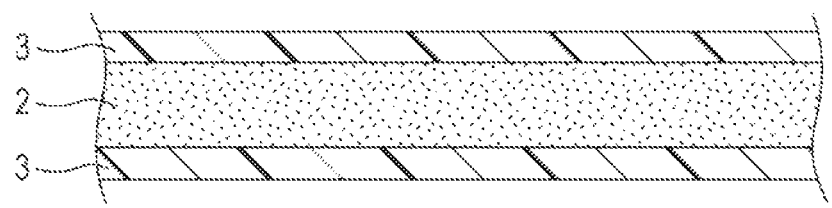
FIG. 1 is a cross-sectional diagram illustrating one configuration example of a laminated microporous film according to an embodiment of the disclosure.

The laminated microporous film 1 according to a first embodiment is a microporous film with superior strength, and specifically, as shown in FIG. 1, is formed from a base 2 which is formed from a non-woven fabric and a surface layer 3 which are formed on at least one of the surfaces of the base 2, includes a resin material and inorganic particles, and has a uniform film thickness due to a pressurizing process or the like being carried out. Here, in a case where the laminated microporous film 1 is used in a battery, that is, is used as a separator, the laminated microporous film 1 prevents the short circuiting of electric current due to both electrodes touching by separating the positive electrode and the negative electrode in a battery and allows lithium ions to pass through. In addition, the laminated microporous film 1 has resistance with regard to a non-aqueous electrolyte.

[Base]

The base 2 is a porous film formed of resin which is configured from a thin film with insulating characteristics which has a specific mechanical strength, and a non-woven fabric is used in the disclosure. A non-woven fabric is used where microfibers which constitute the non-woven fabric may be selected from a polyolefin resin such as polyethylene (PE) or polypropylene (PP), polyethylene terephthalate (PET), polyimide (PI), a composite resin of these resins, glass fibers, or a material such as cellulose. In addition, the non-woven fabric, which is formed using two or more of the microfibers which are formed from these materials, may be formed.

The base 2 is able to be set to an arbitrary thickness as long as the thickness is equal to or more than that which is able to maintain necessary strength of the laminated microporous film 1. In a case where the laminated microporous film 1 is used as a battery separator, the base 2 functions as an important microporous film which prevents short circuiting by achieving insulation of the positive electrode and the negative electrode and has ion permeability for appropriately performing a battery reaction via the laminated microporous film 1. It is preferable that the base 2 is able to sufficiently realize functions such as these and is set to a thickness which is able to increase the volumetric efficiency of an active material layer which contributes to the battery reaction in the battery as much as possible. Specifically, it is preferable that the thickness of the base 2 is equal to or greater than 12 μm and equal to or less than 30 μm. It is preferable that the air permeability of the negative electrode which configures the base 2 is equal to or less than 10 sec./100 ml. In addition, in order to achieve the ion permeability described above, it is preferable that the porosity of the base 2 is equal to or greater than 40% and equal to or less than 60%.

Here, the use of the non-woven fabric as the base 2 is so that the base 2 is not flattened when a film thickness uniforming process is carried out afterwards. For example, a resin microporous film which has been able to be used in the past as the base of the battery separator is a stretched resin film where porous holes were generated using a uniaxial stretching or a biaxial stretching of a resin. In a case where a pressurizing process is performed with regard to the stretched resin film or a laminated film where the stretched resin film is provided on the surface layer, the resins in the stretched resin film remain attached and the holes are flattened. As a result, use as a battery separator is not possible. That is, the laminated microporous film 1 of the disclosure is able to be manufactured in the case where the base 2 is a non-woven fabric and is different to the laminated microporous films in the related art which are provided with a surface layer which includes a resin material and inorganic particles with regard to the stretched resin film.

[Surface Layer]

The surface layer 3 is formed on at least one of the surfaces of the base 2 and includes a resin material and inorganic particles. The surface layer 3 includes inorganic particles buts exists as a functional layer where the inorganic particles do not cause clogging of the small holes formed in the base 2. The inorganic particles impart heat resistance and resistance against oxidation to the surface layer 3. In the surface layer 3, ion permeability is ensured by gaps being formed in at least a portion of the boundaries with the inorganic particles and the resin material. In addition, the resin material itself may ensure ion permeability by holes being formed due to the resin material having, for example, a three-dimensional network structure.

In the laminated microporous film 1 of the disclosure, by a portion of the surface layer 3 entering the large holes which are generated in the base 2, these holes are buried. In addition, the surface of the surface layer 3 is made to be flat, and according to this, unevenness in the film thickness is reduced by the thickness of the laminated microporous film 1 being made to be substantially uniform. Specifically, the thickness being made to be substantially uniform in the disclosure is that the variation in the thickness of the laminated microporous film 1 is equal to or less than 2.5%. Here, the variation in the thickness shows the proportion with regard to the separator thickness of the amount of variation in the separator thickness which is expressed using a standard deviation obtained by measuring the thickness at a plurality of points. In addition, the separator thickness is an average value of the thicknesses obtained by measuring at a plurality of points.

The resin material which constitutes the surface layer 3 is not limited to a type of material as long as there is specific heat resistance in a typical resin film. The surface layer 3 is provided with the aim of burying the large holes which are generated in the base 2 which has high heat resistance and protecting the surface of the laminated microporous film. In addition, in a case where the laminated microporous film 1 of the disclosure is used as a battery separator, it is preferable that a resin material is used which is insoluble with regard to the non-aqueous electrolyte in the battery and is electrochemically safe within the range of uses of the battery.

As the resin material, for example, one type or two or more types of polyolefin materials such as polyethylene and polypropylene, resins which contain fluorine such as polyvinylidene fluoride and polytetrafluoroethylene, rubbers which contain fluorine such as a vinylidene fluoride-hexafluoropropylene-tetrafluoroethylene copolymer, a vinylidene fluoride-tetrafluoroethylene copolymer, and an ethylene-tetrafluoroethylene copolymer, types of rubbers such as a styrene-butadiene copolymer or a hydride thereof, an acrylonitrile-butadiene-styrene copolymer or a hydride thereof, an acrylonitrile-butadiene copolymer or a hydride thereof, a methacrylate ester-acrylic ester copolymer, a styrene-acrylic ester copolymer, acrylonitrile-acrylic ester copolymer, ethylene propylene rubber, polyvinyl alcohol, and polyvinyl acetate, cellulose derivatives such as ethyl cellulose, methyl cellulose, hydroxyethyl cellulose, and carboxymethyl cellulose, resins such as polyphenylene ether, polysulfone, polyethersulfone, polyphenylene sulfide, polyetherimide, polyamidimide, polyamide, and polyester are able to be used. In a case where a resin, where at least one of a melting point or a glass transition temperature is a high temperature such as 180° C. or more, is used as the resin material, it is possible to further increase the heat resistance of the surface layer 3. Among these, it is preferable that polyvinylidene fluoride is used as the resin material.

As the inorganic particles, it is possible to use a metal oxide, a metal nitride, a metal carbide, or the like which is an organic particle with electrical insulating characteristics. As the metal oxide, it is possible to appropriately use alumina ($Al_2O_3$), magnesia (MgO), titania ($TiO_2$), zirconia ($ZrO_2$), silica ($SiO_2$), and the like. As the metal nitride, it is possible to appropriately use silicon nitride ($Si_3N_4$), aluminum nitride (AlN), boron nitride (BN), titanium nitride (TiN), and the like. As the metal carbide, it is possible to appropriately use silicon carbide (SiC), boron carbide ($B_4C$), and the like. Among these, it is preferable to use alumina, titania which has a rutile structure, or silica.

These inorganic particles may be used individually or used as a combination of two or more. The inorganic particles also provide resistance against oxidation, and in a case where the laminated microporous film is used as a battery separator, have high resistance with regard to an oxidation environment of the electrode, and in particular, in the vicinity of the positive electrode when charging. The shape of the inorganic particles is not particularly limited and use of any of spherical shapes, fiber shapes, or random shapes are possible, but in particular, it is preferable to use inorganic particles with spherical shapes.

It is preferable that the average particle diameter of the primary particles of the inorganic particles is a few μm or less from the point of view of the influence on the strength of the separator and the smoothness of the coating surface. Specifically, it is preferable that the average particle diameter of the primary particles is 1.0 μm or less, and more preferably equal to or greater than 0.3 μm and equal to or less than 0.8 μm. The average particle diameter of the primary particles is able to be measured using a method where a photograph obtained using an electron microscope is analyzed using a particle diameter measuring device.

When the average particle diameter of the primary particles of the inorganic particles exceeds 1.0 μm, there are cases where the separator becomes brittle and the coating surface becomes rough. In addition, in a case where the surface layer 3 which includes the inorganic particles is coated and formed on the base 2, there is a concern that there is a portion where the coating liquid which includes the inorganic particles may not have been applied in a case where the primary particles of the inorganic particles are too large.

In addition, it is preferable that the amount of the inorganic particles to be added in the surface layer 3 is such that the mass ratio of the inorganic particles to the resin material in the surface layer 3 is within the range of 5:1 to 12:1. In a case where the amount of the inorganic particles added is too low, the effects of heat resistance, resistance against oxidation and resistance against contraction is reduced in the surface layer 3. In addition, in a case where the amount of the inorganic particles added is too high, it is not preferable as it is difficult to form the surface layer 3.

The surface layer 3 is able to be set to an arbitrary thickness as long as it is formed to have the necessary characteristics of heat resistance, resistance against oxidation, and the like as the entire laminated microporous film 1. In a case where the laminated microporous film 1 is used as a battery separator, it is preferable that the surface layer 3 achieves insulation of the positive electrode and the negative electrode, provides necessary heat resistance as a separator, has ion permeability for appropriately performing a battery reaction via the laminated microporous film 1, and is set to a thickness which is able to increase the volumetric efficiency of an active material layer which contributes to the battery reaction in the battery as much as possible. Specifically, it is preferable that the thickness of the surface layer 3 is equal to or greater than 1 μm and equal to or less than 10 μm. In addition, in order to obtain the ion permeability described above, it is preferable that the porosity of the surface layer 3 is equal to or greater than 30% and equal to or less than 70%.

It is preferable that, in the battery separator which is formed from the laminated microporous film 1 of the disclosure, the surface layer 3 of the laminated microporous film 1 is set so as to be at least positioned on a surface of the positive electrode side, that is, between the positive electrode and the base 2. In the vicinity of the positive electrode, the rate of oxidation when charging is high. As a result, it is possible to obtain an effect of using the surface layer 3 as resistance against oxidation using the inorganic particles which are included in the surface layer 3, and it is possible to suppress the deterioration of the separator.

It is preferable that the air permeability of the entire film of the laminated microporous film 1, which is formed in this manner from the base 2 formed from the non-woven fabric and the surface layer 3 which includes the resin material and the inorganic particles and where a film thickness uniforming process has been carried out, is equal to or greater than 100 sec./100 ml and is equal to or less than 1200 sec./100 ml. The film thickness uniforming process with regard to the laminated microporous film 1 of the disclosure includes a pressurizing process. As a result, the air permeability of the laminated microporous film 1 is higher after the film thickness uniforming process has been carried out than before the film thickness uniforming process is carried out. That is, it is considered that the air permeability of the laminated microporous film 1 after the film thickness uniforming process and the uniformity of the laminated microporous film 1 are correlated. In a case where the air permeability of the laminated microporous film 1 after the film thickness uniforming process is less than 100 sec./100 ml, it is not preferable since there is a tendency for the variation in the thickness of the laminated microporous film 1 to be large. In addition, in a case where the air permeability of the laminated microporous film 1 after the film thickness uniforming process has been carried out is greater than 1200 sec./100 ml, it is not preferable since the ion permeability and the like of the surface layer 3 is reduced.

Here, the surface layer 3 is flattened due to the film thickness uniforming process and the thickness is reduced. In addition, the base 2 is also slightly flattened due to the film thickness uniforming process and the thickness is reduced. The flattening due to the film thickness uniforming process is particularly remarkable in the surface layer 3. As a result, in a case where the permeability in the surface layer 3 has increased to a range which is not preferable, the characteristics of the laminated microporous film 1 are reduced.

(1-2) Manufacturing Method of Laminated Microporous Film

First, a resin solution where the resin material is dissolved is produced by the resin material and a dispersion solvent such as N-methyl-2-pyrrolidone (NMP) being mixed at a predetermined mass ratio and the resin material being dissolved sufficiently in N-methyl-2-pyrrolidone. Next, a coating slurry is produced by a predetermined amount of a fine power of inorganic particles such as alumina being added to the resin solution and stirred using a device with high agitation such as a bead mill.

Here, as the dispersion solvent, N-methyl-2-pyrrolidone (NMP), dimethylacetamide, dimethylformamide, dimethyl sulfoxide, toluene, and the like are able to be used, but it is preferable that N-methyl-2-pyrrolidone is used from the point of view of dissolvability and high dispersion.

Next, the coating slurry which has been produced is coated onto a surface of the base 2 using a coating device such as a tabletop coater. At this time, the coating slurry may enter into the holes of the base 2. In addition, in a case where holes which penetrate through the base 2 which are referred to as pin holes are formed, the coating slurry enters the holes and buries the pin holes. After this, the surface layer 3 is formed by drying using hot air after the base 2 which has been coated with the coating slurry is immersed for a predetermined period of time in a water bath and there is phase separation of the resin material. In addition, the surface layer 3 is formed on another surface of the base 2 when necessary using the same method.

Figure 2:
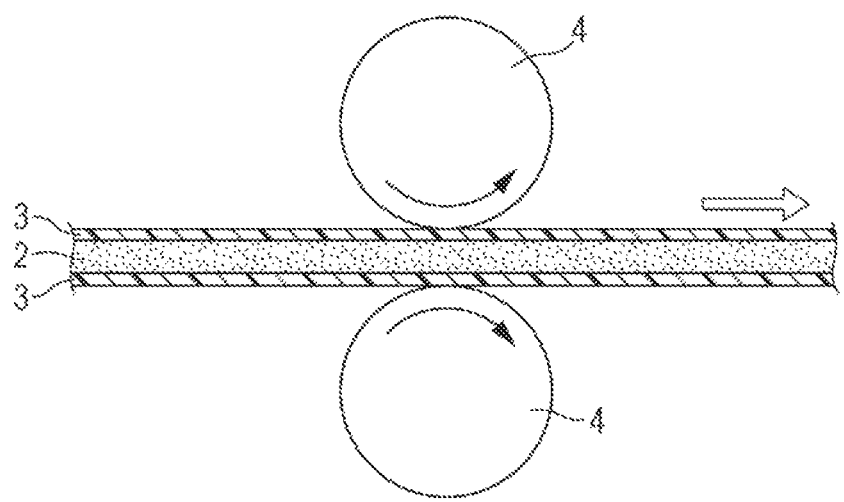
FIG. 2 is a schematic diagram illustrating one example of a film thickness uniforming process when forming a laminated microporous film according to an embodiment of the disclosure.

Next, the film thickness uniforming process is performed with regard to the laminated microporous film 1 where the surface layer 3 has been formed on the base 2. The film thickness uniforming process includes a pressurizing process and may be any process if it is possible for the entire surface of the laminated microporous film 1 to be pressurized. As an example of the film thickness uniforming process, there is a calendar process where a pressurizing device which is provided with mirror surface metal rollers 4 is used as shown in FIG. 2. In a case where a calendar process is performed, it is preferable that pressure with regard to the laminated microporous film 1 is equal to or greater than 20 kgf/cm and equal to or less than 200 kgf/cm. Due to this, it is possible to perform the film thickness uniforming process so that the variation in thickness of the laminated microporous film 1 which is expressed using a standard deviation is equal to or less than 2.5%. Here, in a case where the pressure is too small to be in the range, it is not preferable as the variation in thickness in the film thickness of the laminated microporous film 1 becomes large. In addition, in a case where the pressure is too large to be in the range, it is not preferable as the flattening of the surface layer 3 becomes large. In addition, in order to increase the effects of the film thickness uniforming process, heating may be performed at the same time as pressurizing.

Due to this, it is possible to obtain the laminated microporous film 1 which has the surface layer 3 which is a resin layer where inorganic particles are held on the surface of the non-woven fabric.

<Effect>

According to the first embodiment, it is possible that the laminated microporous film 1 is a thin film due to the performing of the pressurizing process and the unevenness in thickness is small. As a result, it is possible to realize uniformity of the separator characteristics over the entire film and it is possible to obtain an effect of improving the volumetric efficiency in a case of being used as a battery separator. In addition, since the pin holes which are generated in an irregular manner in the non-woven fabric are buried, safety is improved. Furthermore, the mechanical characteristics are improved by forming the surface layer due to the resin material bonding with the microfibers of the non-woven material, the heat resistance and resistance against oxidation is improved and contraction is suppressed in the surface layer due to the inorganic particles.

2. Second Embodiment

The second embodiment of the disclosure is a non-aqueous electrolyte battery which uses the laminated microporous film of the first embodiment as a battery separator.

(2-1) Configuration of Non-Aqueous Electrolyte Battery

Figure 3:
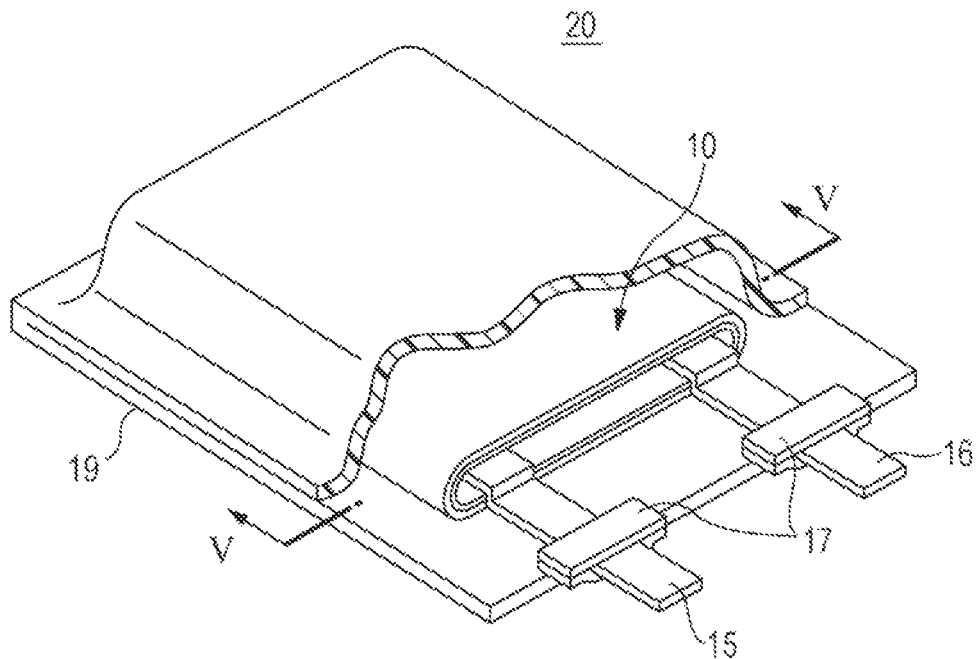
FIG. 3 is a perspective diagram illustrating one configuration example of a non-aqueous electrolyte battery according to a second embodiment of the disclosure.
Figure 4:
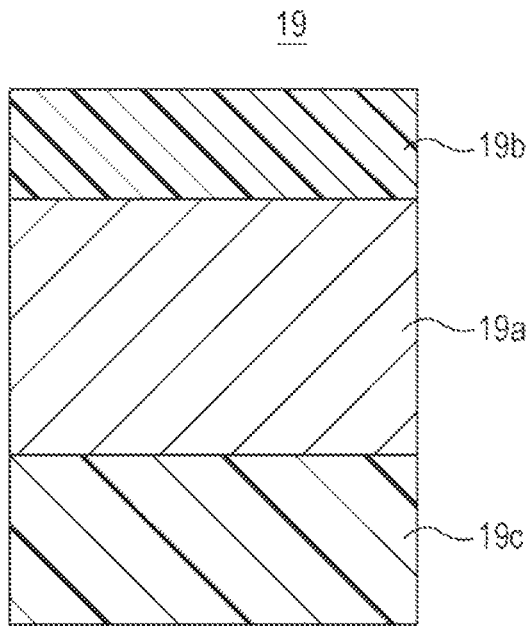
FIG. 4 is a perspective diagram illustrating one configuration example of an outer casing member of a non-aqueous electrolyte battery according to the second embodiment of the disclosure.
Figure 5:
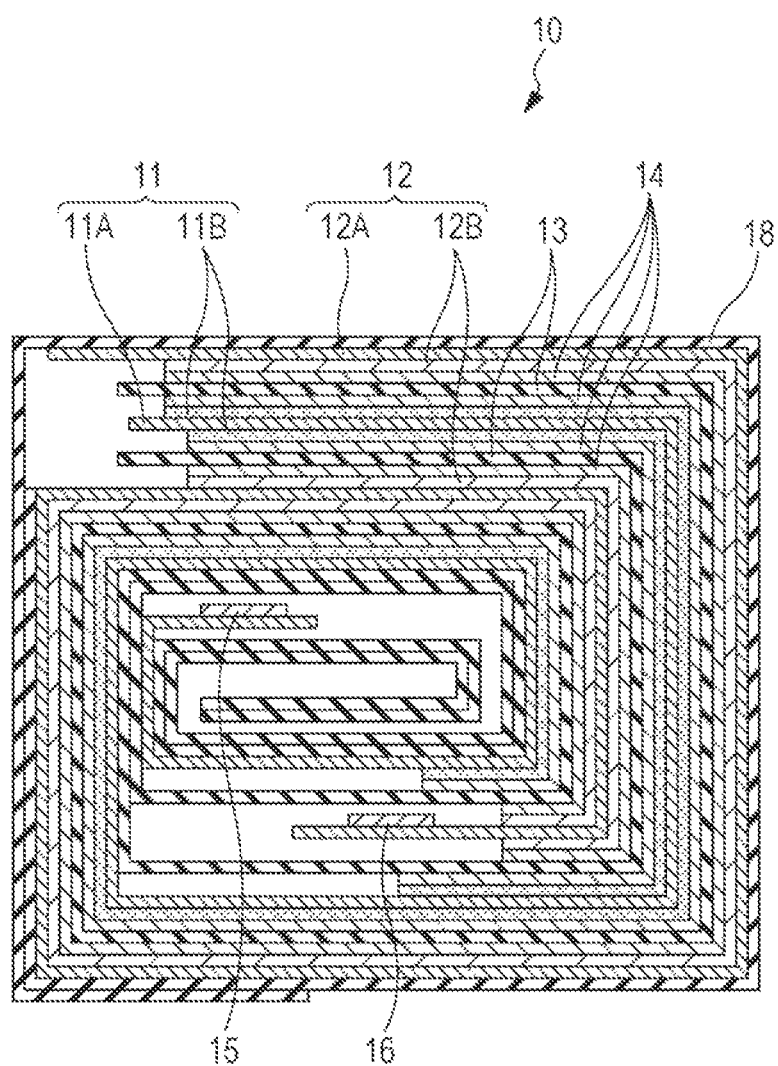
FIG. 5 is a perspective diagram illustrating one configuration example of a non-aqueous electrolyte battery according to the second embodiment of the disclosure.

FIG. 3 is a cross-sectional diagram illustrating one configuration example of a non-aqueous electrolyte battery 20 according to the second embodiment of the disclosure. FIG. 4 is a cross-sectional diagram illustrating one configuration example of an outer casing member 19 of the non-aqueous electrolyte battery 20. FIG. 5 is a cross-sectional diagram illustrating a configuration of a rolled electrode body 10 which is accommodated in the non-aqueous electrolyte battery 20. In the second embodiment, a separator 13 uses the laminated microporous film 1 of the first embodiment.

The non-aqueous electrolyte battery 20 is configured by the rolled electrode body 10 where a positive electrode lead 15 and a negative electrode lead 16 are attached being accommodated in an inner portion of the outer casing member 19 which has a film shape, and has a flat shape. The positive electrode lead 15 and the negative electrode lead 16 each, for example, have a rectangular shape, each lead out from the outer casing member 19 in the same direction, and protrude to the outside from an inner portion of the non-aqueous electrolyte battery 20. The positive electrode lead 15 is configured by, for example, a metallic material such as aluminum (Al) and the negative electrode lead 16 is configured by, for example, a metallic material such as nickel (Ni).

[Outer Casing Member]

The outer casing member 19 which is the outer casing which encases the rolled electrode body 10 is a laminate film which has a configuration where, for example, an inner resin layer 19c, a metallic layer 19a, and an outer resin layer 19b are laminated and adhered in this order from the opposite side of the rolled electrode body 10 as shown in FIG. 4. An adhesive layer with a thickness of, for example, approximately equal to or more than 2 µm and equal to or less than 3 µm may be provided between the outer resin layer 19b and the inner resin layer 19c and the metallic layer 19a. The outer resin layer 19b and the inner resin layer 19c may be each configured by a plurality of layers. In addition, in a case where the non-aqueous electrolyte battery 20 is further accommodated in a rigid outer case or the like, the outer casing member 19 may be a resin film without the metallic layer 19a.

As the metallic material which constitutes the metallic layer 19a, it is sufficient to provide a function as a barrier film resistant to water permeability and it is possible to use aluminum (Al) foil, stainless steel (SUS) foil, nickel (Ni) foil, iron (Fe) foil which has been plated, or the like. Among these, it is preferable that aluminum foil which is thin, lightweight, and superior in terms of workability is appropriately used. In particular, it is preferable that, for example, aluminum (JIS A8021P-O), (JIS A8079P-O), (JIS A1N30-O), and the like where an annealing process has been performed is used from the point of view of workability.

The thickness of the metallic layer 19a is able to be arbitrarily set if necessary strength as a battery casing material is able to be obtained but it is preferable that the thickness of the metallic layer 19a is equal to or more than 30 µm and equal to or less than 50 µm. Due to being within this range, it is possible to provide sufficient material strength and to obtain high workability. In addition, it is possible to suppress reduction in the volumetric efficiency of the non-aqueous electrolyte battery 20 due to an increase in the thickness of a laminate film 31.

The inner resin layer 19c is a portion which is melted by heat and bonds together, and polyethylene (PE), co-extruded cast polypropylene (CPP), polyethylene terephthalate (PET), low-density polyethylene (LDPE), high-density polyethylene (HDPE), linear low-density polyethylene (LL- DPE), and the like are able to be used and it is possible to use a plurality of types of combinations of these.

It is preferable that the thickness of the inner resin layer 19c is equal to or more than 20 μm and equal to or less than 50 μm. Due to being within this range, since it is possible to increase the sealing of the laminate film 31 and to obtain sufficient pressure absorbing action when sealing, it is possible to suppress the generation of shorting. In addition, by not making the inner resin layer 19c, which is a permeation path of water from outside of the battery, to be thicker than necessary, it is possible to suppress generation of gas in the battery, swelling of the battery due to the gas, and reduction in battery characteristics. Here, the thickness of the inner resin layer 19c is the thickness in a state before the encasing of the rolled electrode body 10. After the rolled electrode body 10 is encased with the laminate film 31 and sealed, there may be cases where the thickness of the inner resin layer 19c is outside of the range described above since the two layers of the inner resin layer 19c fuse together.

As the outer resin layer 19b, polyolefin resins, polyamide resins, polyimide resins, polyester, and the like are used due to an attractive outer appearance, toughness, and flexibility. Specifically, it is possible to use nylon (Ny), polyethylene terephthalate (PET), polyethylene naphthalate (PEN), polybutylene terephthalate (PBT), and polybutylene naphthalate (PBN) or to use a plurality of types of combinations of these.

Here, since the laminate film 31 is adhered by the inner resin layer 19c fusing together using heat sealing, it is preferable that the outer resin layer 19b has a melting point which is higher than the inner resin layer 19c. This is so that only the inner resin layer 19c is melted when heat sealing. As a result, the material which is able to be used for the outer resin layer 19b is able to be selected according to the resin material selected as the inner resin layer 19c.

It is preferable that the thickness of the outer resin layer 19b is equal to or more than 10 μm and equal to or less than 30 μm. Due to being within this range, since it is possible to sufficiently obtain a function as a protective layer, and in addition, since it is not increased to an unnecessary thickness, reduction in the volumetric efficiency of the non-aqueous electrolyte battery 20 is suppressed.

FIG. 5 is a cross-sectional diagram along a line V-V of the rolled electrode body 10 shown in FIG. 3. The rolled electrode body 10 is where a positive electrode 11 and a negative electrode 12 are laminated via the separator 13 and a non-aqueous electrolyte layer 14 which is a non-fluid electrolyte and rolled, and is maintained in a rolled state by a protective tape 18 being attached to an outer circumference portion.

[Positive Electrode]

The positive electrode 11 is where a positive electrode active material layer 11B which has positive electrode active material is formed on both sides of a positive electrode collector 11A. As the positive electrode collector 11A, it is possible to use a metallic foil such as aluminum (Al) foil, nickel (Ni) foil, stainless steel (SUS) foil, or the like.

The positive electrode active material layer 11B is configured to include, for example, positive electrode active material, a conducting agent, and a binding agent. As the positive electrode active material, there is the positive electrode active material which includes one type or two or more types of any positive electrode material which is able to absorb or release lithium and may include other materials such as a binding agent and a conducting agent when necessary.

As the positive electrode material which is able to absorb or release lithium, for example, a compound which contains lithium is preferable. This is because high energy density is able to be obtained. As the compound which contains lithium, for example, there are complex oxides which include lithium and a transition metal element, phosphate compounds which include lithium and a transition metal element, and the like. Among these, it is preferable to include at least one type from cobalt (Co), nickel (Ni), manganese (Mn), and iron (Fe) as the transition metal elements. This is because a high voltage is able to be obtained.

As the positive electrode material, a compound containing lithium which is represented by, for example, $Li_xM1O_2$ or $Li_yM2O_4$, is able to be used. In the formula, M1 and M2 represent one or more types of the transition metal elements. The values of x and y are different according to the charging or discharging state of the battery and are normally $0.05 \leq x \leq 1.10$ and $0.01 \leq y \leq 1.10$. As the complex oxide which include lithium and a transition metal element, for example, there are lithium cobalt complex oxides ($Li_xCoO_2$), lithium nickel complex oxides ($Li_yNiO_2$), lithium nickel cobalt complex oxides ($Li_xNi_{1-z}Co_zO_2$ (where $0<z<1$)), lithium nickel cobalt manganese complex oxides ($Li_xNo_{(1-v-w)}Co_vMn_wO_2$ (where $v+w<1$)), lithium manganese complex oxide ($LiMn_2O_4$) with a spinel structure, lithium manganese nickel complex oxide ($Li(Mn_{2-t}Ni_t)O_4$ (where $0<t<2$)), and the like. Among these, a complex oxide which includes cobalt is preferable. This is because high capacity is able to be obtained and superior cycling characteristics are also able to be obtained. In addition, as a phosphate compound which include lithium and a transition metal element, there is lithium iron phosphate ($LiFePO_4$), lithium iron manganese phosphate ($LiFe_{1-u}Mn_uPO_4$ (where $0<u<1$)), and the like.

As a lithium complex oxide, specifically, there is lithium cobalt oxide ($LiCoO_2$), lithium nickel oxide ($LiNiO_2$), lithium manganese oxide ($LiMn_2O_4$), and the like. In addition, a portion of the transition metal elements may be also used in a solid state which replaces another element. For example, there are the examples of nickel cobalt complex oxides ($LiNi_{0.5}Co_{0.5}O_2$, $LiNi_{0.8}Co_{0.2}O_2$, and the like). T complex oxides generate high voltage and are superior in energy density.

Furthermore, in addition, from the point of view of being able to obtain higher electrode repletion and cycling characteristics, there may be a composite particle where the surface of a core particle which is formed from any of the compounds containing lithium is covered by fine particles which are formed from any of the other compounds containing lithium.

In addition, as the positive electrode material which is able to absorb or release lithium, for example, oxides such as vanadium oxide ($V_2O_5$), titanium dioxide ($TiO_2$), manganese dioxide ($MnO_2$), disulfides such as iron disulfide ($FeS_2$), titanium disulfide ($TiS_2$), and molybdenum disulfide ($MoS_2$), chalcogenides which do not include lithium (in particular, layered compounds or compounds with a spinel structure) such as niobium diselenide ($NbSe_2$), lithium compounds which contain lithium, and conductive polymers such as sulfur, polyaniline, polythiophene, polyacetylene, polypyrrole, and the like may be used. Of course, the positive electrode material which is able to absorb or release lithium may be other materials than those described above. In addition, the series of positive electrode materials may be arbitrarily combined and two or more types mixed.

In addition, as the conducting agent, for example, a carbon material such as carbon black or graphite is able to be used. In addition, as the binding agent, for example, polyvinylidene fluoride (PVdF), polytetrafluoroethylene (PTFE), a copolymer in which these are main elements, or the like are able to be used.

The positive electrode 11 has a positive electrode lead 15 which is connected to an edge portion of the positive electrode collector 11A using spot welding or ultrasonic welding. It is preferable that the positive electrode lead 15 is a metallic foil or a mesh shape, but there is no problem if it is not metallic as long as it is electrochemically and chemically stable and is conductive. As a material of the positive electrode lead 15, there is, for example, aluminum (Al), nickel (Ni), and the like

[Negative Electrode]

The negative electrode 12 is where a negative electrode active material layer 12B which has negative electrode active material is formed on both sides of a negative electrode collector 12A. As the negative electrode collector 12A, it is possible to use a metallic foil such as copper (Cu) foil, nickel (Ni) foil, or the like.

The negative electrode active material layer 12B includes one type or two or more types of any negative electrode material which is able to absorb or release lithium as the negative electrode active material and other material such as a binding agent and a conducting agent when necessary. It is preferable that the capacity which is able to be charged in the negative electrode material which is able to absorb or release lithium is larger than the discharging capacity of the positive electrode. Here, the details in relation to the binding agent and the conducting agent are the same as for the positive electrode.

As the negative electrode material which is able to absorb or release lithium, for example, there are carbon materials. As the carbon material, for example, there is graphitizable carbon, non-graphitizable carbon where the spacing of the (002) plane is 0.37 nm or more, graphite where the spacing of the (002) plane is 0.34 nm or less, and the like. More specifically, there are pyrolytic carbons, cokes, glassy carbon fibers, organic polymer compound fired substances, activated carbon, and carbon black. Out of the carbon material, as the cokes, pitch coke, needle coke, petroleum coke, and the like are included. The organic polymer compound fired substances refer to polymer materials such as phenol resin or furan resin which is fired at an appropriate temperature and carbonized. Since the change in the crystalline structure which accompanies the absorbing or releasing of lithium is extremely small, the carbon material is preferable as high capacity is able to be obtained and superior cycling characteristics are also able to be obtained as well as functioning as a conductive agent. Here, the shape of the carbon material may be any of fiber form, spherical form, particle form, or scale form.

Other than the carbon materials described above, as the negative electrode material which is able to absorb or release lithium, for example, there are materials which are able to absorb or release lithium and which have at least one type of metal element or metalloid element as a constituent element. This is so as to be able to obtain high energy density. Negative electrode material such as this may be a single metal element or metalloid element, an alloy or a compound or may have at least a portion with a phase of one type or two or more types. Here, as the "alloy" in the embodiment, in addition to alloys formed from two or more types of metal elements, there are also alloys formed from one or more types of metal element and one or more type of metalloid element. In addition, the "alloy" may include a nonmetallic element. In this organization, there are solid solutions, eutectics (eutectic mixtures), intermetallic compounds, or combinations of two or more types thereof As the metal elements or metalloid elements described above, there are metal elements or metalloid elements which are able to form an alloy with lithium. Specifically, there is magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), platinum (Pt), and the like. Among these, at least one type out of silicon and tin is preferable and silicon is more preferable. This is because high energy density is able to be obtained since the capacity to absorb or release lithium is large.

As the negative electrode material which has at least one type out of silicon and tin, for example, there is silicon by itself, as an alloy, or a compound, tin by itself, as an alloy, or a compound, or a material which has at least a portion with one type or two or more types of phase.

As an alloy with silicon, for example, as the second constituent element other than silicon, there is at least one type from the group of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). As an alloy with tin, for example, as the second constituent element other than tin (Sn), there is at least one type from the group of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

As the compound with tin and the compound with silicon, for example, there are compounds with oxygen (0) or carbon (C), and in addition to tin (Sn) or silicon (Si), the second constituent elements described above may be included.

In particular, as the negative electrode material which has at least one type out of silicon (Si) and tin (Sn), for example, it is preferable to set tin (Sn) as the first constituent element and to include a second constituent element and a third constituent element in addition to tin (Sn). Of course, the negative electrode material may be used together with the negative electrode materials described above. The second constituent element is at least one type from the group of cobalt (Co), iron (Fe), magnesium (Mg), titanium (Ti), vanadium (V), chromium (Cr), manganese (Mn), nickel (Ni), copper (Cu), zinc (Zn), gallium (Ga), zirconium (Zr), niobium (Nb), molybdenum (Mo), silver (Ag), indium (In), cerium (Ce), hafnium (Hf), tantalum (Ta), tungsten (W), bismuth (Bi), and silicon (Si). The third constituent element is at least one type from the group of boron (B), carbon (C), aluminum (Al), and phosphorous (P). This is because, by including the second constituent element and the third constituent element, cycling characteristics are improved.

Among these, a material which contains CoSnC with tin (Sn), cobalt (Co), and carbon (C) as the constituent elements is preferable where the amount of carbon (C) is in the range of equal to or more than 9.9% by mass and equal to or less than 29.7% by mass and the portion of cobalt (Co) with regard to the total of tin (Sn) and cobalt (Co) (Co/(Sn+Co))is in a range of equal to or more than 30% mass and equal to or less than 70% mass. This is because, in this composition range, high energy density is able to be obtained and superior cycling characteristics are able to be obtained.

The material which contains CoSnC may further include other constituent elements when necessary. As the other constituent elements, for example, silicon (Si), iron (Fe), nickel (Ni), chromium (Cr), indium (In), niobium (Nb), germanium (Ge), titanium (Ti), molybdenum (Mo), aluminum (Al), phosphorous (P), gallium (Ga), and bismuth (Bi) are preferable, and two or more types may be included. This is because the capacity characteristics and the cycling characteristics are further improved.

Here, the material which contains CoSnC has phases which include tin (Sn), cobalt (Co), and carbon (C), and it is preferable that the phase has a low crystalline structure or an amorphous structure. In addition, in the material which contains CoSnC, it is preferable that at least a portion of the carbon which is a constituent element is bonded with a metallic element or a metalloid element which is another constituent element. This is because, it is considered that the reduction in the cycling characteristics is due to the condensing or crystallizing of tin (Sn) or the like, but the condensing or crystallizing is suppressed by the carbon bonding with another element.

In addition, as the negative electrode material which is able to absorb or release lithium, for example, there are metal oxides, highly polymerized compounds, and the like which are able to absorb or release lithium. As the metal oxides, there are iron oxides, ruthenium oxides, molybdenum oxides, and the like. As the highly polymerized compounds, there are polyacetylene, polyaniline, polypyrrole, and the like.

Here, the negative electrode material which is able to absorb or release lithium may be a material other than those described above. In addition, the negative electrode material described above may mix two or more types in an arbitrary combination.

The negative electrode active material layer 12B may be formed by, for example, any of a gas phase method, a liquid phase method, a thermal spraying method, a baking method, or coating and two or more of these may be combined. In a case where the negative electrode active material layer 12B is formed using a gas phase method, a liquid phase method, a thermal spraying method, a baking method, or a method of two or more of these, it is preferable that at least a portion of the interface of the negative electrode active material layer 12B and the negative electrode collector 12A is alloyed. Specifically, at the interface, it is preferable that the constituent elements of the negative electrode collector 12A are dispersed in the negative electrode active material layer 12B or the constituent elements of the negative electrode active material layer 12B are dispersed in the negative electrode collector 12A or the constituent elements of both of these are dispersed in each other. This is because it is possible to suppress breakage due to expansion and contraction of the negative electrode active material layer 12B which accompanies charging and discharging and it is possible to improve electron conductivity between the negative electrode active material layer 12B and the negative electrode collectors 12A.

Here, as the gas phase, for example, there are physical deposition or chemical deposition, specifically, vacuum evaporation, sputtering, ion plating, laser ablation, chemical vapor deposition, plasma chemical vapor deposition, and the like. As the liquid phase method, it is possible to use common methods such as electroplating or electroless plating. As the baking method, for example, there is a method where, after coating by the negative electrode active material in particle form being mixed with a binding agent and the like and dispersed in a solvent, there is a heating process at a temperature higher than the melting point of the binding agent and the like. It is also possible to use common methods in relation to the baking method, and for example, there is atmosphere baking, reaction baking, and hot press baking As the binding agent, for example, polyvinylidene fluoride (PVdF), styrene butadiene rubber (SBR), and the like are able to be used.

The negative electrode 12 has a negative electrode lead 16 which is connected to an edge portion of the negative electrode collector 12A using spot welding or ultrasonic welding. It is preferable that the negative electrode lead 16 is a metallic foil or a mesh shape, but there is no problem if it is not metallic as long as it is electrochemically and chemically stable and is conductive. As a material of the negative electrode lead 16, there is, for example, copper (Cu), nickel (Ni), and the like.

[Separator]

It is possible to use the laminated microporous film 1 of the first embodiment as the separator 13. The separator 13 is arranged so that the surface layer 3 faces at least the positive electrode, that is, the surface layer 3 is positioned at least between the positive electrode and the base 2 when arranging the inside of the battery. Due to this, it is possible for the separator 13 to be protected from the oxidation environment and the high temperature environment in the vicinity of the positive electrode when there are high charging voltages.

In the non-aqueous electrolyte battery 20, when charging, for example, lithium ions are released from the positive electrode 11 and are absorbed by the negative electrode 12 via the electrolyte impregnated in the separator 13. On the other hand, when discharging, for example, lithium ions are released from the negative electrode 12 and are absorbed by the positive electrode 11 via the electrolyte impregnated in the separator 13.

[Electrolyte]

The non-aqueous electrolyte layer 14 includes an electrolyte and a high polymer compound which retains the electrolyte and is in a so-called gel form. The electrolyte includes an electrolyte salt and a solvent which dissolves the electrolyte salt. As the electrolyte salt, for example, there is lithium hexafluorophosphate ($LiPF_6$), lithium tetrafluoroborate ($LiBF_4$), lithium perchlorate ($LiClO_4$), lithium hexafluoroarsenate monohydrate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), lithium hexafluorosilicate ($Li_2SiF_6$), lithium chloride (LiCl), lithium bromide (LiBr), and the like. Any one type of the electrolyte salts may be used or a combination of two or more types may be used.

As the solvent, for example, there are lactone solvents such as γ-butyrolactone, γ-valerolactone, δ-valerolactone, and ε-caprolactone, carbonate solvents such as ethylene carbonate (EC), propylene carbonate (PC), butylene carbonate (BC), vinylene carbonate (VC), dimethyl carbonate (DMC), ethyl methyl carbonate (EMC), and diethyl carbonate (DEC), ether solvents such as 1,2-dimethoxyethane, 1-ethoxy-2-methoxyethane, 1,2-diethoxyethane, tetrahydrofuran, and 2-methyltetrahydrofuran, nitrile solvents such as acetonitrile, sulfolane solvents, phosphoric acid, phosphoric acid ester solvents, and non-aqueous solvents such as pyrrolidone. The solvent may be used with any one type by itself, or two or more types may be mixed and used.

In addition, as the solvent, it is preferable that a compound is included where a portion or all of the hydrogen in a cyclic ester or a chain ester is fluorinated. As the compound which is fluorinated, it is preferable to use a difluoroethylene carbonate (4,5-difluoro-1,3-dioxolan-2-one). Even in a case whether the negative electrode 12 which includes a compound of silicon (Si), tin (Sn), germanium (Ge) or the like as the negative electrode active material is used, it is possible to improve the charging and discharging cycling characteristics as the cycling characteristics improvement effect of difluoroethylene carbonate is superior.

It is sufficient if the high polymer compound absorbs the solvent and is in a gel form, and for example, there are fluorinate high polymer compounds such as polyvinylidene fluoride (PVdF) or a copolymer of vinylidene fluoride (VdF) and hexafluoropropylene (HFP), ether high polymer compounds such as polyethylene oxide (PEO) or a crosslinked compound which includes polyethylene oxide, or a compound of a repeating unit of polyacrylonitrile (PAN), polypropylene oxide (PPO), or polymethyl methacrylate (PMMA). As the high polymer compound, any one type may be used by itself or two or more types may be mixed and used In particular, from the point of view of oxidation reduction stability, the fluorinate high polymer compounds are preferable, and among these, a copolymer which includes vinylidene fluoride and hexafluoropropylene as elements is preferable. Furthermore, the copolymer may include monoesters of unsaturated dibasic acids such as maleic acid monomethyl ester (MME), halogenated ethylene such as in polychlorotrifluoroethylene (PCTFE), unsaturated compounds of cyclic carbonates such as vinylene carbonate (VC), vinyl acrylic monomers which include an epoxy group, and the like as elements. This is because higher characteristics are able to be obtained.

(2-2) Manufacturing Method of Non-Aqueous Electrolyte Battery

[Manufacturing Method of Positive Electrode]

A positive electrode mixture is prepared by mixing the positive electrode active material, the binding agent, and conducting agent, and a liquid mixture is prepared by dispersing the positive electrode mixture in a solvent such as N-methyl-2-pyrrolidone. Next, after the positive electrode mixture slurry is coated on the positive electrode collector 11A and dried, the positive electrode active material layer 11B is formed by compressive molding using a rolling press or the like and the positive electrode 11 is obtained.

[Manufacturing Method of Negative Electrode]

A negative electrode mixture is prepared by mixing the negative electrode active material and the binding agent, and is made into a negative electrode mixture slurry by dispersing the negative electrode mixture in a solvent such as N-methyl-2-pyrrolidone. Next, after the negative electrode mixture slurry is coated on the negative electrode collector 12A and the solvent is dried, the negative electrode active material layer 12B is formed by compressive molding using a rolling press or the like and the negative electrode 12 is obtained.

In addition, in a case where a metallic or alloy negative electrode is used, it is possible to use a gas phase method, a liquid phase method, a thermal spraying method, a baking method, or the like. In addition, in a case where two or more of these methods are used, it is preferable that at least a portion of the interface of the negative electrode active material layer 12B and the negative electrode collector 12A is alloyed. Specifically, at the interface, it is preferable that the constituent elements of the negative electrode collector 12A are dispersed in the negative electrode active material layer 12B or the constituent elements of the negative electrode active material layer 12B are dispersed in the negative electrode collector 12A or the constituent elements of both of these are dispersed in each other. This is because it is possible to suppress breakage due to expansion and contraction of the negative electrode active material layer 12B which accompanies charging and discharging and it is possible to improve electron conductivity between the negative electrode active material layer 12B and the negative electrode collectors 12A.

Here, as the gas phase method, for example, there are physical deposition or chemical deposition, specifically, vacuum evaporation, sputtering, ion plating, laser ablation, chemical vapor deposition, plasma chemical vapor deposition, and the like. As the liquid phase method, it is possible to use common methods such as electroplating or electroless plating. As the baking method, for example, there is a method where, after coating by the negative electrode active material in particle form being mixed with a binding agent and the like and dispersed in a solvent, there is a heating process at a temperature higher than the melting point of the binding agent and the like. It is also possible to use common methods with relation to the baking method, and for example, there is atmosphere baking, reaction baking, and hot press baking

[Assembly Method of Non-Aqueous Electrolyte Battery]

First, a precursor solution is prepared to include a non-aqueous solvent, an electrolyte salt, and a solvent when necessary. After the precursor solution is coated on the surfaces of each of the positive electrode 11 and the negative electrode 12, the solvent is volatized and a non-aqueous electrolyte layer is formed in gel form. Next, the positive electrode lead 15 and the negative electrode lead 16 are respectively attached to the positive electrode collector 11A and the negative electrode collector 12A. Here, the positive electrode lead 15 and the negative electrode lead 16 may be attached to the positive electrode collector 11A and the negative electrode collector 12A before the forming of the non-aqueous electrolyte layer.

Next, the positive electrode 11 and the negative electrode 12 where the non-aqueous electrolyte layer has been provided are laminated via the separator 13, rolled in a lengthwise direction, and a rolled electrode body is formed by the outermost circumference portion being bonded using protective tape. At this time, the laminated microporous film of the first embodiment is used as the separator 13.

Finally, for example, after the rolled electrode body 10 is interposed between an outer casing member with two films, the outer edge portions of the outer casing member 19 are bonded using heat sealing and sealed at a reduced pressure and the rolled electrode body 10 is sealed. At this time, an adhesive film 17 is inserted between the positive electrode lead 15 and the negative electrode lead 16 and the outer casing member 19. In addition, before sealing the outer casing member 19, non-aqueous electrolyte may be injected when necessary. Due to this, the non-aqueous electrolyte battery 20 of the disclosure is complete <Effect>

According to the second embodiment, it is possible to provide a separator which is thinner, has no pin holes, and has substantially uniform film thickness while providing the same separator characteristics such as heat resistance, resistance against oxidation and ion permeability as in the past. As a result, the non-aqueous electrolyte battery which uses the laminated microporous film of the disclosure is used as the separator has high levels of safety and improves the volumetric efficiency of the battery.

Figure 6:
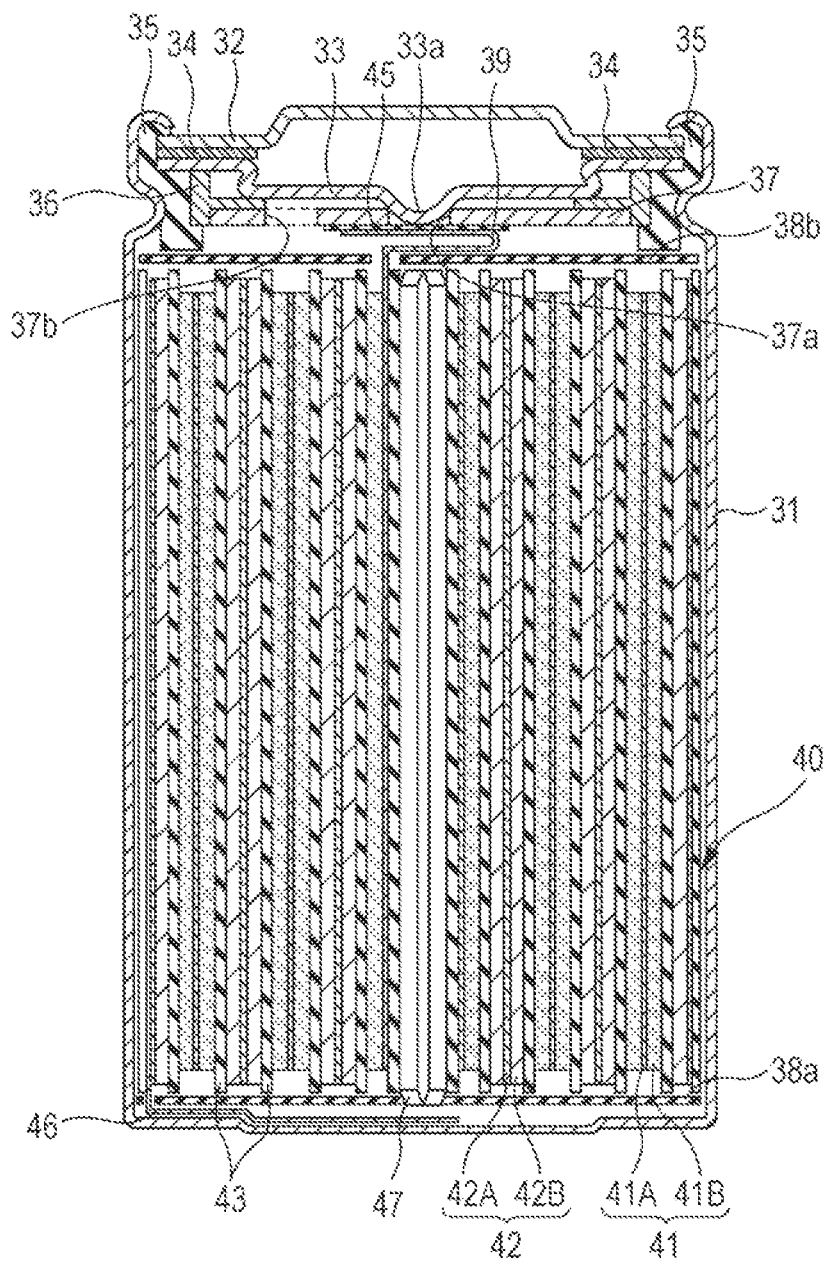
FIG. 6 is a cross-sectional diagram illustrating one configuration example of a cylindrical non-aqueous electrolyte battery according to an embodiment of the disclosure

3. Third Embodiment (3-1) Overall Configuration of Non-Aqueous Electrolyte Battery FIG. 6 is a cross-sectional diagram illustrating one example of a non-aqueous electrolyte battery 30 according to a third embodiment. The battery is a so-called cylindrical type and has a rolled electrode body 40 where a positive electrode 41 and a negative electrode 42 with strip shapes are rolled via a separator 43 along with a non-aqueous electrolyte layer (not shown) in an inner portion of a battery can 31 which has substantially a hollow cylindrical shape. The battery can 31 is configured by, for example, iron (Fe) being plated with nickel (Ni), and one end portion is closed while the other end portion is open. At an inner portion of the battery can 31, each of a pair of insulating plates 38*a* and 38*b* is disposed perpendicularly with regard to the rolled circumference surface so as to interpose the rolled electrode body 40.

As the material of the battery can 31, there is iron (Fe), nickel (Ni), stainless steel (SUS), aluminum (Al), titanium (Ti), and the like. In order to prevent electrochemical corrosion due to the non-aqueous electrolyte which accompanies the charging and discharging of the battery, for example, plating using nickel or the like may be carried out in the battery can 31. In the open end portion of the battery can 31, a battery cap 32 which is a positive electrode lead plate and a safety valve mechanism and a PTC (Positive Temperature Coefficient) element 34 which are provided at an inner side of the battery cap 32 are attached by caulking via an insulation sealing gasket 35.

The battery cap 32 is configured by, for example, the same material as the battery can 31 and is provided with an opening portion for discharging gas which is generated in the battery. The safety valve mechanism has a safety valve 33, a disk holder 36 and a breaker disk 37 overlapping in order. A protrusion portion 33*a* of the safety valve 33 is connected to a positive electrode lead 45 which protrudes from the rolled electrode body 40 via a sub disk 19 which is arranged so as to cover a hole portion 37*a* which is provided at a central portion of the breaker disk 37. The positive electrode lead 45 is prevented from being drawn into the hole portion 37*a* when the safety valve 33 is reversed by the safety value 33 and the positive electrode lead 45 being connected via the sub disk 19. In addition, the safety valve mechanism is electrically connected to the battery cap 32 via the PCT element 34.

In a case where the inner pressure of the battery is a constant or more due to shorting of the inside of the battery or heat from outside of the battery, the safety valve mechanism reverses the safety valve 33 and cuts off the electrical connection of the protrusion portion 33*a*, the battery cap 32, and the rolled electrode body 40. That is, when the safety valve 33 is reversed, the positive electrode lead 45 is pressed by the breaker disk 37 and the connection between the safety value 33 and the positive electrode lead 45 is released. The disk holder 36 is formed from an insulating material and insulates the safety valve 33 and the breaker disk 37 in a case where the safety valve 33 is reversed.

In addition, in a case where further gas is generated in the battery and the inner pressure of the battery further increases, a portion of the safety valve 33 is broken down and the gas is able to be discharged to the battery cap 32 side.

In addition, there is a configuration where, for example, a plurality of gas release holes 37*b* is provided in the vicinity of the hole portion 37*a* of the breaker disk 37 and it is possible to effectively discharge gas to the battery can 32 side in a case where gas is generated in the rolled electrode body 40.

The PCT element 34 cuts off current, by increasing the resistance value when the temperature increases and electrically cutting off the battery cap 32 and the rolled electrode body 40, and thus, prevents abnormal heat generation due to excessive current. The insulation sealing gasket 35 is configured by, for example, an insulating material and asphalt is coated on a surface thereof.

The rolled electrode body 40 which is accommodated in the non-aqueous electrolyte battery 30 is rolled around and centered, for example, on a center pin 47. The rolled electrode body 40 is where the positive electrode 41 and the negative electrode 42 are laminated in order via the separator 43 and rolled in a lengthwise direction. In the rolled electrode body 40, the positive electrode lead 45 is connected to the positive electrode 41 and the negative electrode lead 46 is connected to the negative electrode 42. As described above, the positive electrode lead 45 is welded to the safety valve 33 and is electrically connected to the battery cap 32, and the negative electrode lead 46 is welded and electrically connected to the battery can 31.

Here, it is possible to use the laminated microporous film 1 of the first embodiment as the separator 43. In addition, it is possible to use the positive electrode 11 and the negative electrode 12 of the second embodiment as the positive electrode 41 and the negative electrode 42.

(3-2) Manufacturing Method of Non-Aqueous Electrolyte Battery

The non-aqueous electrolyte battery 30 is able to be manufactured, for example, as follows. Here, since the positive electrode 41, the negative electrode 42, and the separator 43 are manufactured using the same method as the first embodiment and the second embodiment, the description will be omitted.

[Manufacturing of Center Pin]

A center pin material with a thin plate shape is prepared and the center pin material is cut into a predetermined size using, for example, a pressing process. Next, the center pin 47 is formed by the center pin material being rounded and formed into a cylinder and a taper portion being provided at both ends by tapering.

[Assembly of Non-Aqueous Electrolyte Battery]

A laminate electrode body 24 is formed by the positive electrode 41 and the negative electrode 42 being laminated via the separator 43 and the rolled electrode body 40 is manufactured by the laminate electrode body 24 being rolled. Next, the center pin 47 is inserted into a center portion of the rolled electrode body 40. Next, the negative electrode lead 46 is welded to the bottom portion of the battery can 31 while interposing one of the insulating plates 38*a* or 38*b* with the rolled electrode body 40 and the positive electrode lead 45 is welded to the protrusion portion 33*a* of the safety valve 33. Next, the rolled electrode body 40 is accommodated in an inner portion of the battery can 31 and the non-aqueous electrolyte is injected into an inner portion of the battery can 31 and is impregnated in the separator 43. Finally, in the opening end portion of the battery can 31, the battery cap 32, the safety valve mechanism such as the safety valve 33, and the PTC element 34 are fixed by caulking via the insulation sealing gasket 35. Due to this, the non-aqueous electrolyte battery 30 of the disclosure as shown in FIG. 6 is complete.

In the non-aqueous electrolyte battery 30, when charging, for example, lithium ions are released from the positive electrode 41 and are absorbed by the negative electrode 42 via the electrolyte impregnated in the separator 43. On the other hand, when discharging, for example, lithium ions are released from the negative electrode 42 and are absorbed by the positive electrode 41 via the electrolyte impregnated in the separator 43.

<Effect>

According to the third embodiment, it is possible to obtain the same effects as the second embodiment.

4. Fourth Embodiment (4-1) Configuration of Non-Aqueous Electrolyte Battery

Figure 7A:
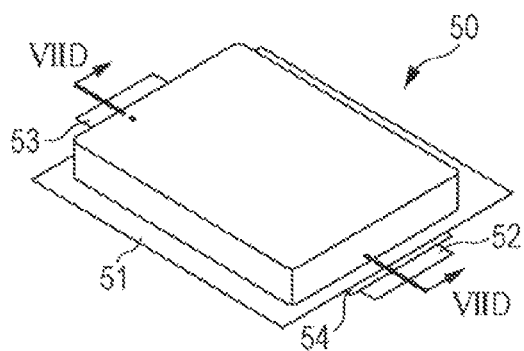
FIGS. 7A to 7D are outline diagrams illustrating one example of a laminated electrode body which configures a non-aqueous electrolyte battery according to an embodiment of the disclosure.
Figure 7B:
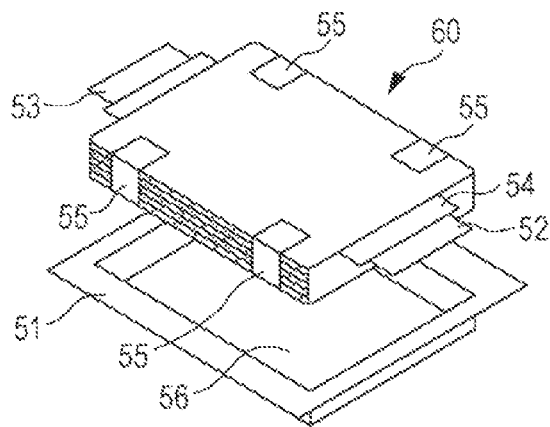
Figure 7C:
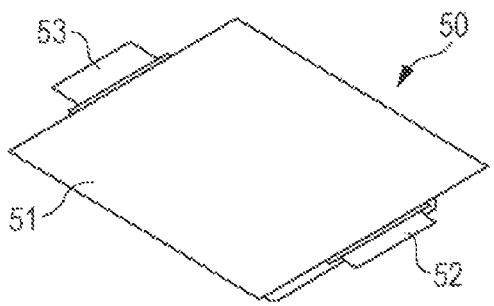
Figure 7D:
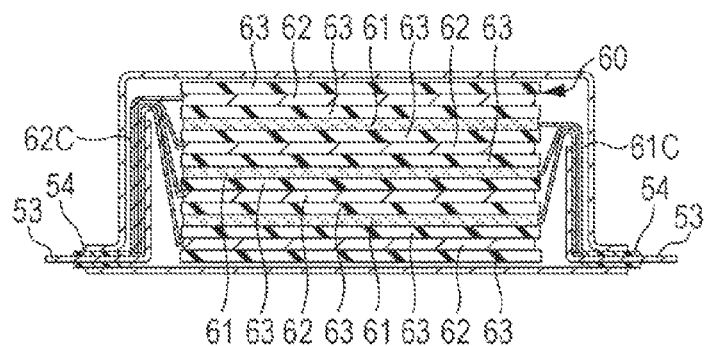

FIG. 7A is a perspective diagram illustrating an outer appearance of a non-aqueous electrolyte battery 50 according to an embodiment of the disclosure and FIG. 7B is an exploded perspective diagram illustrating a configuration of the non-aqueous electrolyte battery 50. In addition, FIG. 7C is a perspective diagram illustrating a configuration of a lower surface of the non-aqueous electrolyte battery 50 shown in FIG. 7A and FIG. 7D is a cross-sectional diagram illustrating a cross section along VIID-VIID of the non-aqueous electrolyte battery 50 of FIG. 7A. Here, in the description below, in the non-aqueous electrolyte battery 50, a portion where a positive electrode lead 52 is lead out from is a top portion, a portion which faces the top portion and where a negative electrode lead 53 is lead out from is a bottom portion, and both sides which are interposed by the top portion and the bottom portion are side portions. In addition, in regard to the electrodes and electrode leads, the description is made such that the direction between side portions is the width.

The non-aqueous electrolyte battery 50 of the disclosure is where a laminate electrode body 60 which is a battery element is encased in an outer casing member 51 which is formed from a laminate film, and from a portion where the outer casing members 51 are sealed, the positive electrode lead 52 and the negative electrode lead 53 which are electrically connected to the laminate electrode body 60 are lead out to outside of the battery. The positive electrode lead 52 and the negative electrode lead 53 are lead out from sides which oppose each other.

Here, it is preferable that the thickness of the laminate electrode body 60 used in the fourth embodiment is equal to or more than 5 mm and equal to or less than 20 mm. When the thickness of the laminate electrode body 60 is less than 5 mm, since it is thin, there is a tendency for the influence of heat storage to be small and heat escapes even if there are no irregularities in the cell surface. On the other hand, when the thickness of the laminate electrode body 60 exceeds 20 mm, the distance from the battery surface to the central portion of the battery is too large and there is a temperature difference in the battery when using only the releasing of heat from the battery surface, and thus there is a tendency that the longevity performance is influenced.

In addition, it is preferable that the discharging capacity of the laminate electrode body 60 is equal to or more than 3 Ah and equal to or less than 50 Ah. When the discharging capacity of the laminate electrode body 60 is less than 3 Ah, since the battery capacity is small, there is a tendency that it is possible to suppress heat generation by other methods such as reducing the battery capacity by increasing the thickness of the collector foil and the like and reducing resistance. When the discharging capacity of the laminate electrode body 60 exceeds 50 Ah, the battery heat capacity is large and it is difficult for heat to be released, so that there is a tendency for variation in heat in the battery to become large.

Figure 8A:
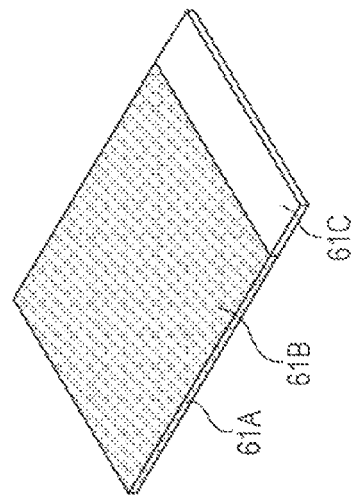
FIGS. 8A to 8D are perspective diagrams illustrating one configuration example of a positive electrode and a negative electrode which are used in a non-aqueous electrolyte battery according to an embodiment of the disclosure.
Figure 8B:
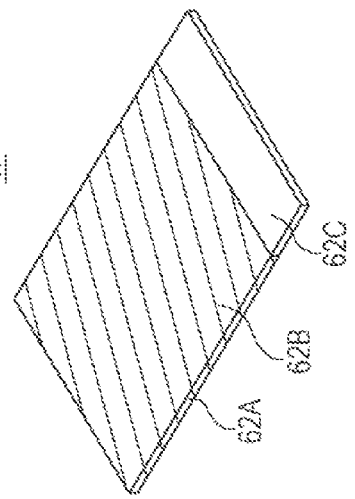
Figure 8C:
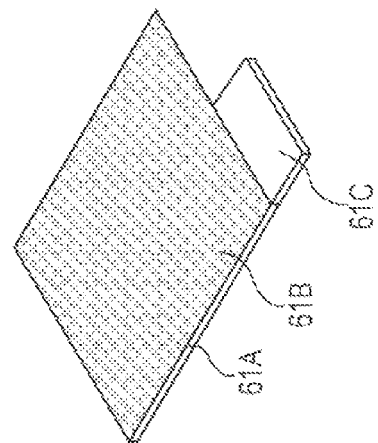
Figure 8D:
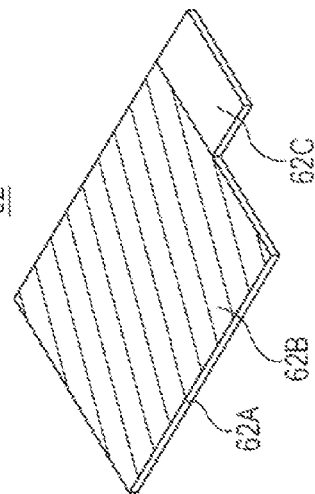
Figure 9A:
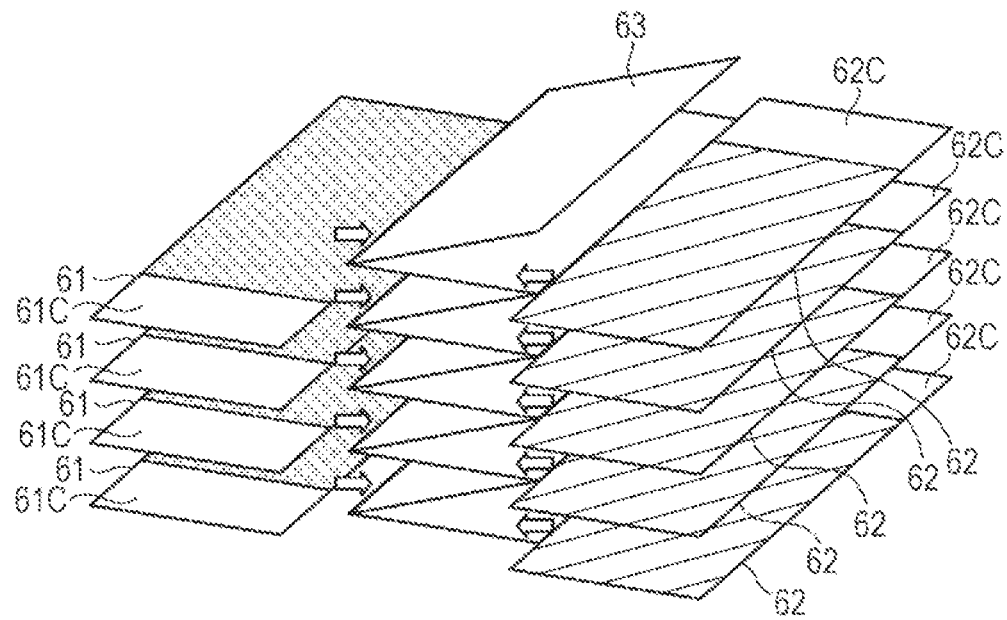
FIGS. 9A and 9B are perspective diagrams illustrating one configuration example of a laminated electrode body of a non-aqueous electrolyte battery according to an embodiment of the disclosure.
Figure 9B:
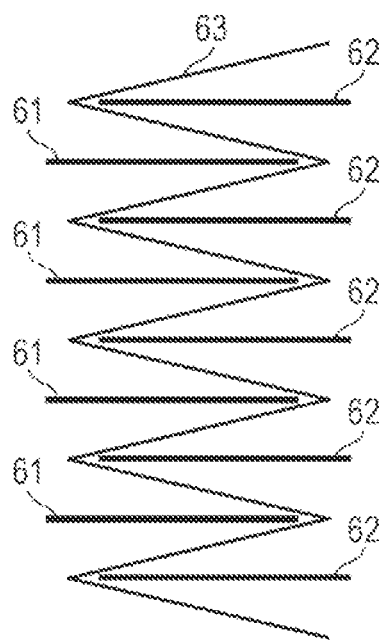

The laminate electrode body 60 accommodated in the non-aqueous electrolyte battery 50 has a configuration where a positive electrode 61 with a rectangular shape as shown in FIGS. 8A and 8B and a negative electrode 62 with a rectangular shape as shown in FIGS. 8C and 8D are laminated via a separator 63. Specifically, for example, as shown in FIGS. 9A and 9B, there is a configuration where the positive electrode 61 and the negative electrode 62 are alternately laminated via the separator 63 which is folded in a zigzag.

[Laminate Electrode Body]

The laminate electrode body 60 has a laminate electrode configuration where the positive electrode 61 with a rectangular shape and the negative electrode 62 with a rectangular shape are alternating laminated via the separator 63. In the fourth embodiment, as an example of the laminate electrode configuration, the laminate electrode body 60 is used where the separator 63, the negative electrode 62, the separator 63, the positive electrode 61, the separator 63, the negative electrode 62, . . . , the separator 63, the negative electrode 62, the separator 63 are laminated in order so that the surface layer of the laminate electrode body 60 is the separator 63. Here, the surface layer of the laminate electrode body 60 is not limited to the separator 63 and the positive electrode 61 or the negative electrode 62 may be the surface layer.

From the laminate electrode body 60, positive electrode tabs 61C which extend from each of the plurality of positive electrodes 61 and negative electrode tabs 62C which extend from each of the plurality of negative electrodes 62 are lead out. The plurality of overlapping positive electrode tabs 61C is configured to be folded so that the cross section is substantially a U shape in a state where there is appropriate slack in the folding portion. In tip portions of the plurality of overlapping positive electrode tabs 61C, the positive electrode lead 52 is connected using a method such as ultrasonic welding, positive resistance welding, and the like.

In addition, in the same manner as the positive electrode 61, the plurality of negative electrode tabs 62C overlaps and is configured to be folded so that the cross section is substantially a U shape in a state where there is appropriate slack in the folding portion. In tip portions of the plurality of overlapping negative electrode tabs 62C, the negative electrode lead 53 is connected using a method such as ultrasonic welding, positive resistance welding, and the like.

Below, each portion which configures the laminate electrode body 60 will be described.

[Positive Electrode Lead]

It is possible to form the positive electrode lead 52 which is connected to the positive electrode tabs 61C using, for example, a metallic lead body formed from aluminum (Al) or the like. In the large-capacity non-aqueous electrolyte battery 50 of the disclosure, in order to output high currents, the width of the positive electrode lead 52 is thicker and the thickness is set to be thicker than in the past.

It is possible to arbitrarily set the width of the positive electrode lead 52, but from the point of view of outputting a large current, it is preferable that the width of the positive electrode lead 52 is equal to or more than 50% and equal to or less than 100% with regard to the width of the positive electrode 61. In addition, in a case where the positive electrode lead 52 and the negative electrode lead 53 lead out from the same side, it is necessary that the width of the positive electrode lead 52 is less than 50% of the width of the positive electrode 61. This is because it is necessary that the positive electrode lead 52 is provided at a position which does not touch the negative electrode lead 53. In addition, in this case, in order to combine the sealing of the outer casing member 51 and high current charging and discharging, it is preferable that the width of the positive electrode lead 52 is equal to or more than 15% and equal to or less than 40% of the width of the positive electrode 61, and more preferably, is equal to or more than 35% and equal to or less than 40%.

It is preferable that the thickness of the positive electrode lead 52 is equal to or more than 150 μm and equal to or less than 250 μm. In a case where the thickness of the positive electrode lead 52 is less than 150 μm, the amount of current output is reduced. In a case where the thickness of the positive electrode lead 52 is more than 250 μm, since the positive electrode lead 52 is too thick, the sealing of the outer casing member 51 in the side where the lead is lead out is reduced and it is easy for moisture to enter.

Here, in a portion of the positive electrode lead 52, a sealant 54 is provided which is an adhesive film for improving the adhesion of the outer casing member 51 and the positive electrode lead 52. The sealant 54 is configured by a resin material which is highly adhesive to metallic materials, and for example, in a case where the positive electrode lead 52 is configured from the metallic material described above, it is preferable for the sealant 54 to be configured from polyethylene, polypropylene, or a polyolefin resin such as modified polyethylene or modified polypropylene.

It is preferable that the thickness of the sealant 54 is equal to or more than 70 μm and equal to or less than 130 μm. When less than 70 μm, the adhesion of the positive electrode lead 52 and the outer casing member 51 deteriorates, and when more than 130 μm, the amount of flow of the fusion resin when heat sealing is large and it is not preferable in the manufacturing process.

[Negative Electrode Lead]

It is possible to form the negative electrode lead 53 which is connected to the negative electrode tabs 62C using, for example, a metallic lead body formed from nickel (Ni) or the like. In the large-capacity non-aqueous electrolyte battery 50 of the disclosure, in order to output high currents, the width of the negative electrode lead 53 is thicker and the thickness is set to be thicker than in the past.

It is possible to arbitrarily set the width of the negative electrode lead 53, but from the point of view of outputting a large current, it is preferable that the width of the negative electrode lead 53 is equal to or more than 50% and equal to or less than 100% with regard to the width of the negative electrode 62. In addition, in a case where the positive electrode lead 52 and the negative electrode lead 53 lead out from the same side, it is necessary that the width of the negative electrode lead 53 is less than 50% of the width of the negative electrode 62. This is because it is necessary that the negative electrode lead 53 is provided at a position which does not touch the positive electrode lead 52. In addition, in this case, in order to combine the sealing of the outer casing member 51 and high current charging and discharging, it is preferable that the width of the negative electrode lead 53 is equal to or more than 15% and equal to or less than 40% of the width of the negative electrode 62, and more preferably, is equal to or more than 35% and equal to or less than 40%.

It is preferable that the thickness of the negative electrode lead 53 is equal to or more than 150 μm and equal to or less than 250 μm in the same manner as the positive electrode lead 52. In a case where the thickness of the negative electrode lead 53 is less than 150 μm, the amount of current output is reduced. In a case where the thickness of the negative electrode lead 53 is more than 250 μm, since the negative electrode lead 53 is too thick, the sealing of the outer casing member 51 in the side where the lead is lead out is reduced and it is easy for moisture to enter.

Here, in a portion of the negative electrode lead 53, a sealant 54 is provided which is an adhesive film for improving the adhesion of the outer casing member 51 and the negative electrode lead 53 in the same manner as the positive electrode lead 52.

[Positive Electrode]

As shown in FIGS. 8A and 8B, the positive electrode 61 is provided with an extension portion where a positive electrode collector 61A extends from a main surface portion with a rectangular shape and a positive electrode active material layer 61B is formed with a rectangular shape in an upper portion of the main surface. The extension portion in a state where the positive electrode collector 61A is exposed provides a function as the positive electrode tab 61C which is a connection tab for connecting to the positive electrode lead 52. The width of the positive electrode tab 61C is able to be arbitrarily set and a portion of the positive electrode collector exposure portion may be cut off when necessary as shown in FIG. 8A. In particular, in a case where the positive electrode lead 52 and the negative electrode lead 53 lead out from the same side, it is necessary that the width of the positive electrode tab 61C is less than 50% of the width of the positive electrode 61.

It is possible to use the same material as the positive electrode 11 of the second embodiment as the positive electrode active material, the conducting agent, and the binding agent which configure the positive electrode active material layer 61B.

[Negative Electrode]

As shown in FIGS. 8C and 8D, the negative electrode 62 is provided with an extension portion where a negative electrode collector 62A extends from a main surface portion with a rectangular shape and a negative electrode active material layer 62B is formed with a rectangular shape in an upper portion of the main surface. The extension portion in a state where the negative electrode collector 62A is exposed provides a function as the negative electrode tab 62C which is a connection tab for connecting to the negative electrode lead 53. The width of the negative electrode tab 62C is able to be arbitrarily set and a portion of the negative electrode collector exposure portion may be cut off when necessary as shown in FIG. 8C. In particular, in a case where the positive electrode lead 52 and the negative electrode lead 53 lead out from the same side, it is necessary that the width of the negative electrode tab 62C is less than 50% of the width of the negative electrode 62.

It is possible to use the same material as the negative electrode 12 of the second embodiment as the negative electrode active material, the conducting agent, and the binding agent which configure the negative electrode active material layer 62B.

[Separator]

It is possible to use the laminated microporous film 1 of the first embodiment as the separator 63. In addition, in the fourth embodiment, as an example where a gel electrolyte layer is formed, a case will be described which uses the separator 63 where a high polymer material which includes vinylidene fluoride is adhered to the surface in advance. By using the separator 63 where a high polymer material which includes vinylidene fluoride is adhered to the surface in advance, a gel electrolyte layer is formed by reacting a high polymer material which includes vinylidene fluoride and a non-aqueous electrolyte and retaining a non-aqueous electrolyte liquid.

In the large-capacity non-aqueous electrolyte secondary battery of the disclosure, it is possible to appropriately use a separator with a thickness of equal to or more than 13 μm and equal to or less than 40 μm, and more preferably equal to or more than 20 μm and equal to or less than 30 μm. When too thick, the separator reduces the battery capacity by reducing the filler content of the active material and reduces the battery characteristics by reducing the ion transferring. On the other hand, when too thin, the mechanical strength of the film is reduced.

[Non-Aqueous Electrolyte]

The non-aqueous electrolyte is where an electrolyte salt is dissolved in a non-aqueous solvent and is inserted in the outer casing member 51 along with the laminate electrode body 60. As the non-aqueous solvent and the electrolyte salt, it is possible to use the same material as the second embodiment.

Here, a gel electrolyte layer may be formed without attaching a high polymer material which includes vinylidene fluoride on the surface of the separator 63. In this case, a sol solution which is formed by a matrix polymer taking in a non-aqueous electrolyte is coated on both surfaces of each of the positive electrode 61 and the negative electrode 62 or both surfaces of the separator 63 and dried. Due to this, it is possible to form a gel electrolyte layer where the matrix polymer takes in the non-aqueous electrolyte.

[Laminate Film]

The outer casing member 51 which is an outer casing which encases the laminate electrode body 60 is able to use a laminate film which is represented by a laminate configuration of an outer resin layer 51b, a metallic layer 51a, and an inner resin layer 51c in the same manner as the outer casing member 19 of the second embodiment. Here, the non-aqueous electrolyte battery 50 of the fourth embodiment has larger dimensions than in the past where the size of the electrode leads are larger and thickness is also larger so as to output high-capacity currents. Accordingly, it is preferable that the thickness of each of the layers is set to be thicker than that in the laminate film which is used the non-aqueous electrolyte battery 20 of the second embodiment.

Specifically, it is preferable that the thickness of the metallic layer 51a is equal to or more than 30 µm and equal to or less than 150 µm. In a case of being less than 30 µm, the mechanical strength is inferior. In addition, in a case of being more than 150 µm, workability becomes remarkably difficult and the volumetric efficiency of the non-aqueous electrolyte secondary battery is reduced by an increase in the thickness of the outer casing member 51.

It is preferable that the thickness of the outer resin layer 51b is equal to or more than 25 µm and equal to or less than 35 µm. When less than 25 µm, the functioning as a protective layer is inferior. When more than 35 µm, the volumetric efficiency of the non-aqueous electrolyte secondary battery is reduced.

It is preferable that the thickness of the inner resin layer 51c is equal to or more than 20 µm and equal to or less than 50 µm. When less than 20 µm, adhesion is reduced and it is easy for shorting to occur as the pressure absorbing action is insufficient. When more than 50 µm, it is easy for water to enter via the inner resin layer 51c and there is a concern that gas may be generated in the battery, the battery may swell up due to the gas, and battery characteristics may be reduced. Here the thickness of the inner resin layer 51c is the thickness in a state before the encasing of the laminate electrode body 60. After the laminate electrode body 60 is encased with the outer casing member 51 and sealed, there may be cases where the thickness of the inner resin 51c is outside of the range described above since the two layers of the inner resin layer 51c fuse together.

[Configuration of Non-Aqueous Electrolyte Battery]

The laminate electrode body 60 as described above is encased in the outer casing member 51 described above. At this time, the positive electrode lead 52 which is connected to the positive electrode tags 61C and the negative electrode lead 53 which is connected to the negative electrode tags 62C are lead out to the outside of the battery from the sealed portion of the outer casing member 51. As shown in FIG. 7B, in the outer casing member 51, a laminate electrode body accommodating portion 56 which is formed in advance using deep drawing is provided. The laminate electrode body 60 is accommodated in the laminate electrode body accommodating portion 56.

(4-2) Manufacturing Method of Non-Aqueous Electrolyte Battery

It is possible to manufacture the non-aqueous electrolyte battery using the process below.

[Manufacturing of Positive Electrode]

In the same manner as the second embodiment, a positive electrode mixture slurry is manufactured and the positive electrode mixture slurry is coated so as to provide a positive electrode collector exposure portion on both surfaces of metallic foil which is the positive electrode collector 61A which is continuous in a strip shape. Next, after the solvent in the positive electrode mixture slurry is dried up, the positive electrode active material layer 61B is formed by compressive molding using a rolling press or the like and made into a positive electrode sheet. The positive electrode 61 is manufactured by the positive electrode sheet being cut into determined dimensions. The positive electrode collector exposure portion is the positive electrode tab 61C. In addition, the positive electrode tab 61C may be formed by an unnecessary portion of the positive electrode collector exposure portion being cut off when necessary. Due to this, the positive electrode 61 which is integrally formed with the positive electrode tab 61C is able to be obtained.

[Manufacturing of Negative Electrode]

In the same manner as the second embodiment, a negative electrode mixture slurry is manufactured and the negative electrode mixture slurry is coated so as to provide a negative electrode collector exposure portion on both surfaces of metallic foil which is the negative electrode collector 62A which is continuous in a strip shape. Next, after the solvent in the negative electrode mixture slurry is dried up, the negative electrode active material layer 62B is formed by compressive molding using a rolling press or the like and made into a negative electrode sheet. The negative electrode 62 is manufactured by the negative electrode sheet being cut into determined dimensions. The negative electrode collector exposure portion is the negative electrode tab 62C. In addition, the negative electrode tab 62C may be formed by an unnecessary portion of the negative electrode collector exposure portion being cut off when necessary. Due to this, the negative electrode 62 which is integrally formed with the negative electrode tab 62C is able to be obtained.

[Manufacturing of Separator]

It is possible to use the laminated microporous film 1 of the first embodiment as the separator 63.

[Laminating Process]

Next, as shown in FIGS. 9A and 9B, a predetermined number of the positive electrodes 61 and the negative electrodes 62 are laminated by the positive electrode 61 and the negative electrode 62 being alternating inserted in the separator 63 with a zigzag folding, and for example, overlapped and combined so as to become the separator 63, the negative electrode 62, the separator 63, the positive electrode 61, the separator 63, the negative electrode 62, . . . , the separator 63, the negative electrode 62, the separator 63.

Next, the laminate body 60 is manufactured by the positive electrode 61, the negative electrode 62, and the separator 63 being fixed in a state of being pressed so as to be adhered. In order to strongly fix the laminate electrode body 60, for example, it is possible to use a fixing member 55 such as an adhesive tape. In a case of fixing using the fixing member 55, for example, the fixing member 55 is provided at both side portions of the laminate electrode body 60.

Next, the plurality of positive electrode tabs 61C and the plurality of negative electrode tabs 62C are folded so that a cross section is a U shape. The electrode tags are folded using, for example, the tab folding method of Japanese Unexamined Patent Application Publication No. 2009-187768.

[Outer Casing Process]

After this, the manufactured laminate electrode body 60 is encased using the outer casing member 51 and is heat sealed by heating one side portion, the top portion, and the bottom portion using a heater head. The top portion and the bottom portion where the positive electrode lead 52 and the negative electrode lead 53 are lead out from are heat sealed by heating using, for example, a heating head which has a cut-out portion.

Next, non-aqueous electrolyte is injected from an opening in the other side portion which is not heat sealed. Finally, the side portion of the outer casing member 51 where the injecting is perform is heat sealed and the laminate electrode body 60 is sealed in the outer casing member 51. After this, the laminate electrode body 60 is pressurized and heat from the outside of the outer casing member 51 and the non-aqueous electrolyte is retained in the high polymer which includes vinylidene fluoride. Due to this, a gel electrolyte layer is formed between the positive electrode 61 and the negative electrode 62.

5. Fifth Embodiment

In the fifth embodiment, a battery unit which uses the non-aqueous electrolyte battery 50 of the fourth embodiment and a battery module where the battery units are combined will be described.

[Battery Unit]

Figure 10A:
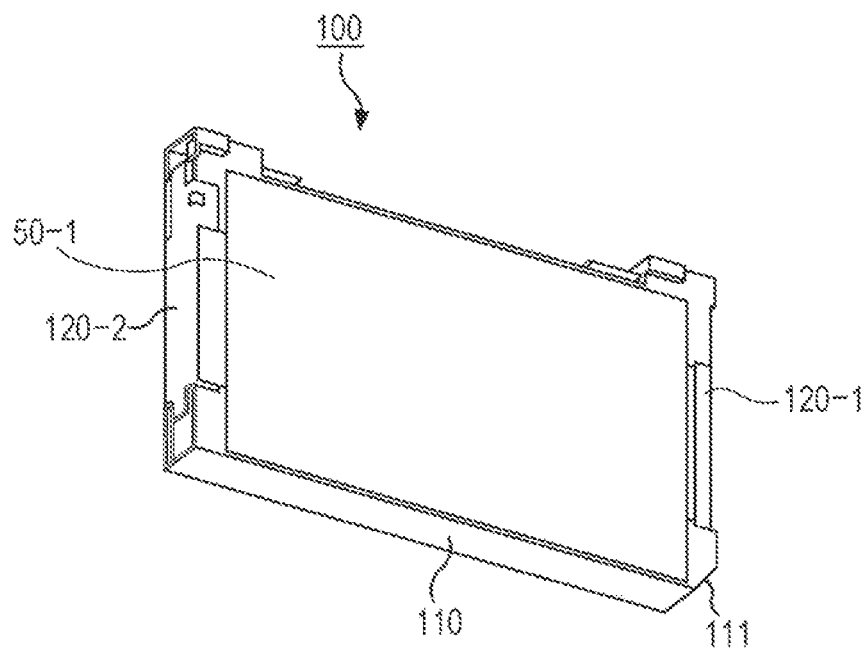
FIGS. 10A and 10B are perspective diagrams illustrating a configuration of a battery unit which uses a non-aqueous electrolyte battery according to an embodiment of the disclosure.
Figure 10B:
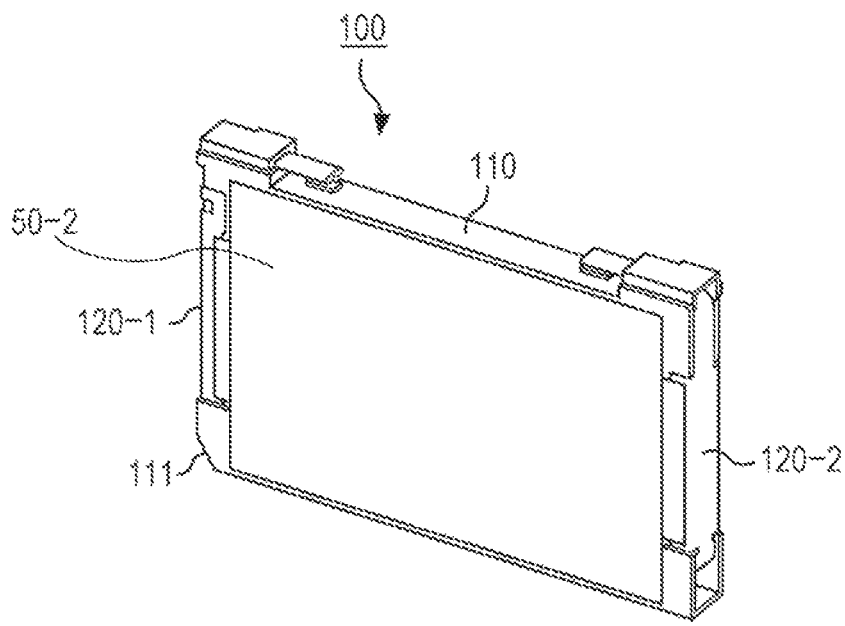

FIGS. 10A and 10B are perspective diagram illustrating a configuration example of a battery unit of the disclosure. In FIGS. 10A and 10B, a battery unit 100 which is seen from different sides is shown. The side mainly shown in FIG. 10A is the front surface side of the battery unit 100 and the side mainly shown in FIG. 10B is the rear surface side of the battery unit 100. As shown in FIGS. 10A and 10B, the battery unit 100 is configured to be provided with non-aqueous electrolyte batteries 50-1 and 50-2, a bracket 110, and bus bars 120-1 and 120-2.

The bracket 110 is a support tool for securing the strength of the non-aqueous electrolyte batteries 50-1 and 50-2, and the non-aqueous electrolyte battery 50-1 is mounted on the front surface side of the bracket 110 and the non-aqueous electrolyte battery 50-2 is mounted on the rear surface side of the bracket 110. Here, the bracket 110 has substantially the same shape when viewed from either the front surface side or the rear surface side, but a surface bevel portion 111 is formed in a corner portion on one of the lower sides, and the side where the surface bevel portion 111 is seen on the lower right is the front surface side and the side where the surface bevel portion 111 is seen on the lower left is the rear surface side The bus bars 120-1 and 120-2 are metallic members with substantially an L shape and are mounted on both side surface of the bracket 110 so that connection portions which connect to tabs of the non-aqueous electrolyte batteries 50-1 and 50-2 are arranged on the side surface side of the bracket 110 and the terminal which connect to outside of the battery unit 100 are arranged on the front surface of the bracket 110.

Figure 11:
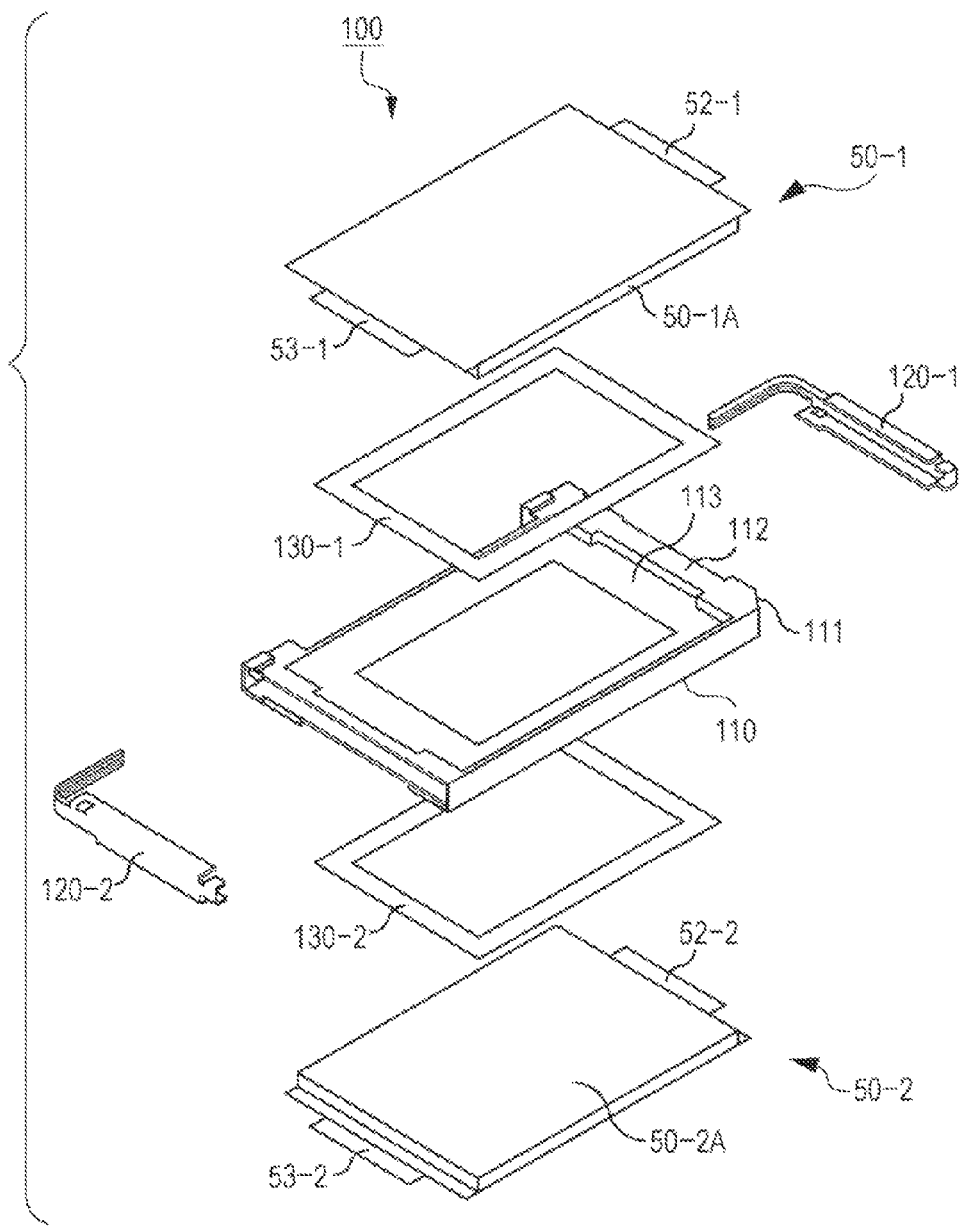
FIG. 11 is an exploded perspective diagram illustrating a configuration of a battery unit which uses a non-aqueous electrolyte battery according to an embodiment of the disclosure.

FIG. 11 is a perspective diagram illustrating a state where the battery unit 100 is disassembled. The upper side of FIG. 11 is the front surface side of the battery unit 100 and the lower side of FIG. 11 is the rear surface side of the battery unit 100. Below, a convex portion which accommodates the laminate electrode body 60 in an inner portion in the non-aqueous electrolyte battery 50-1 is referred to as a battery main body 50-1A. In the same manner, a convex portion which accommodates the laminate electrode body 60 in an inner portion in the non-aqueous electrolyte battery 50-2 is referred to as a battery main body 50-2A.

Then, the non-aqueous electrolyte batteries 50-1 and 50-2 are mounted in the bracket 110 in a state where the sides of the battery main bodies 50-1A and 50-2A which have a convex shape face each other. That is, the non-aqueous electrolyte battery 50-1 is mounted in the bracket 110 so that a surface where a positive electrode lead 52-1 and a negative electrode lead 53-1 are provided faces the front surface side and the non-aqueous electrolyte battery 50-2 is mounted in the bracket 110 so that a surface where a positive electrode lead 52-2 and a negative electrode lead 53-2 is provided faces the rear surface side.

The bracket 110 has an outer periphery wall 112 and a rib portion 113. The outer periphery walls 112 are formed so as to surround the battery main bodies 50-1A and 50-2A in a state of being slightly wider than the outer periphery of the battery main bodies 50-1A and 50-2A of the non-aqueous electrolyte batteries 50-1 and 50-2, that is, where the non-aqueous electrolyte batteries 50-1 and 50-2 are mounted. A rib portion 113 is formed in the side surface in an inner side of the outer periphery wall 112 to extend toward an inner side from a central portion in the thickness direction of the outer periphery wall 112.

In the configuration in FIG. 11, the non-aqueous electrolyte batteries 50-1 and 50-2 are inserted in the outer periphery wall 112 from the front surface side and the rear surface side of the bracket 110 and are adhered to both surfaces of the rib portion 113 of the bracket 110 using double-sided tape 130-1 and 130-2 which have adhesiveness on both surfaces. The double-sided tape 130-1 and 130-2 has substantially a square frame shape with a predetermined width along the outer periphery edge of the non-aqueous electrolyte batteries 50-1 and 50-2 and it is sufficient if the rib portion 113 of the bracket 110 is provided in only an area where the double-sided tape 130-1 and 130-2 is adhered.

The rib portion 113 is formed so as to extend toward an inner side from an outer side in the inner portion of the outer periphery wall 112 with a predetermined width along the outer periphery edge of the non-aqueous electrolyte batteries 50-1 and 50-2 in this manner, and there is an opening portion in a side to the inside of the rib portion 113. Accordingly, there is a gap due to the opening portion between the non-aqueous electrolyte battery 50-1 which is adhered to the rib portion 113 using the double-sided tape 130-1 from the front surface side of the bracket 110 and the non-aqueous electrolyte battery 50-2 which is adhered to the rib portion 113 using the double-sided tape 130-2 from the rear surface side of the bracket 110.

That is, by forming the opening portion in a central portion of the bracket 110, the non-aqueous electrolyte batteries 50-1 and 50-2 are mounted in the bracket 110 with a gap with dimensions which is the total of the thickness of the rib portion 113 and the thickness of the double-sided tape 130-1 and the double-sided tape 130-2. For example, in the non-aqueous electrolyte batteries 50-1 and 50-2, there may be slight swelling due to charging and discharging or generation of gas, but the gap which is provided using the opening is a space where there is room for the swelling of the non-aqueous electrolyte batteries 50-1 and 50-2. Accordingly, it is possible to eliminate the influence such as an increase in size of the entire battery unit 100 due to the portion where there is swelling in the non-aqueous electrolyte batteries 50-1 and 50-2.

In addition, when the non-aqueous electrolyte batteries 50-1 and 50-2 are adhered to the rib portion 113, considerable pressure is necessary in a case where the adhesion area is large, but it is possible to efficiently apply pressure and easily perform adhesion by limiting the adhesion surface of the rib portion 113 to the outer periphery wall. Due to this, it is possible to reduce the stress on the non-aqueous electrolyte batteries 50-1 and 50-2 during manufacturing.

As shown in FIG. 11, by attaching the two non-aqueous electrolyte batteries 50-1 and 50-2 to the one bracket 110, for example, it is possible to reduce the thickness and the space of the bracket 110 more than a case where, for example, one non-aqueous electrolyte battery is attached to one bracket. Due to this, it is possible to improve the energy density.

In addition, since the rigidity of the battery unit 100 in the thickness direction is able to be obtained using a synergy effect of attaching the two non-aqueous electrolyte batteries 50-1 and 50-2, it is possible to reduce the thickness of the rib portion 113 of the bracket 110. That is, for example, even if the thickness of the rib portion 113 is equal to or less than 1 mm (approximately the thickness which is the limit for resin molding), it is possible to obtain sufficient rigidity over the entire battery unit 100 by attaching the non-aqueous electrolyte batteries 50-1 and 50-2 to both sides of the rib portion 113. Then, as a result of reducing the thickness of the battery unit 100 and reducing the volume by reducing the thickness of the rib portion 113, it is possible to improve the energy density of the battery unit 100.

In addition, in order to increase resistance against stress from the outside, the battery unit 100 has a configuration where the outer periphery surfaces (both side surfaces and upper and lower surfaces) of the non-aqueous electrolyte batteries 50-1 and 50-2 do not touch the inner periphery surface of the outer periphery wall 112 of the bracket 110 and has a configuration of being adhered to the rib portion 113 at a wider surface than the non-aqueous electrolyte batteries 50-1 and 50-2.

Due to the configuration, it is possible to realize the battery unit 100 where the energy density is high and which has strength to counteract stress from the outside.

[Battery Module]

Next, a configuration example of a battery module 200 where the battery units 100 are combined will be described with reference to FIGS. 12 to 15. The battery module 200 is configured to be provided with a module case 210, a rubber sheet portion 220, a battery portion 230, a battery cover 240, a fixed sheet 250, an electric part portion 260, and a box cover 270.

Figure 12:
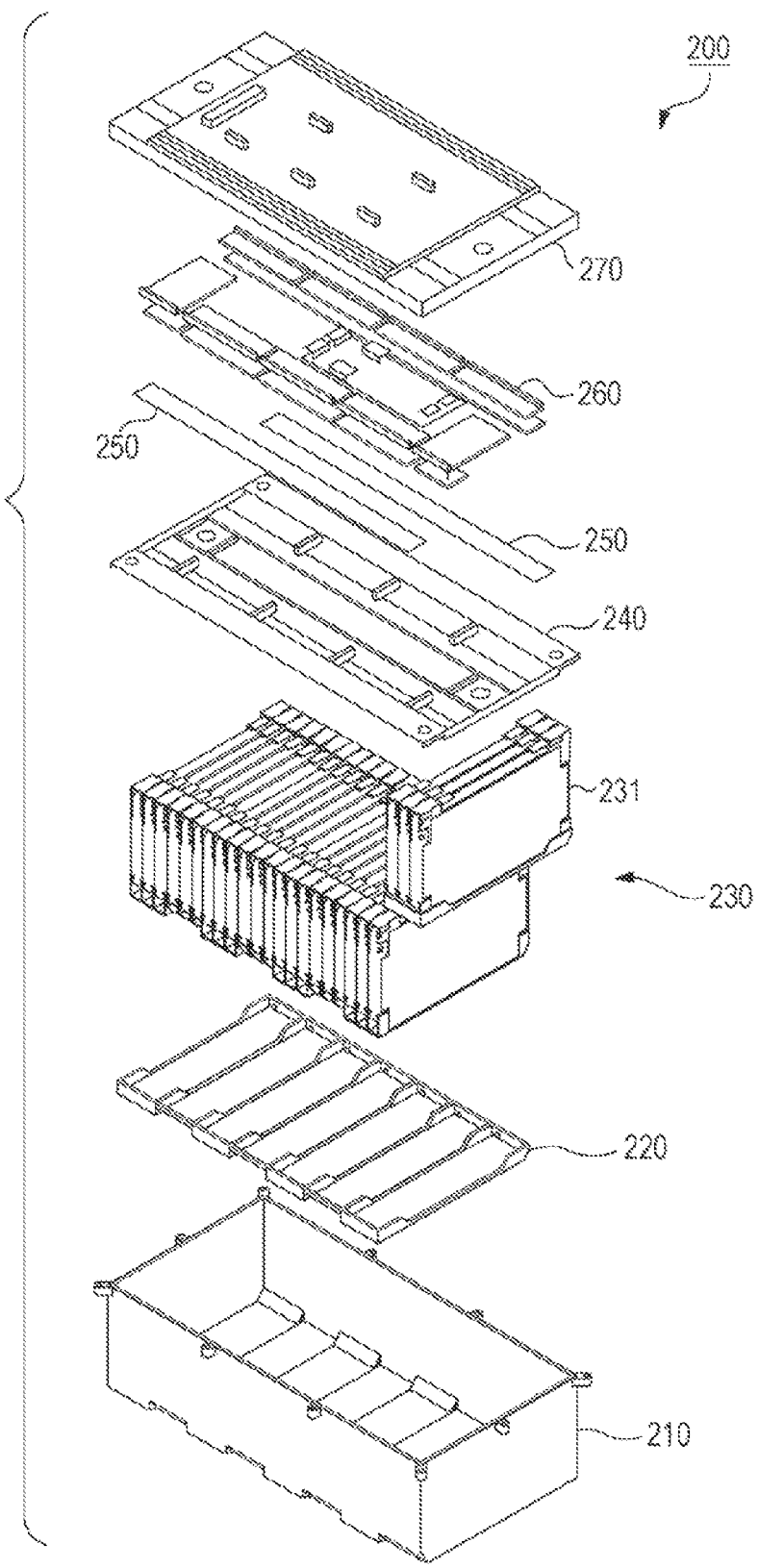
FIG. 12 is a perspective diagram illustrating a configuration of a battery module which uses a non-aqueous electrolyte battery according to an embodiment of the disclosure.

The module case 210 is a case for accommodating the battery units 100 and mounting in a device to be used and is a size where 24 battery units 100 are able to be accommodated in the configuration example in FIG. 12.

The rubber sheet portion 220 is a sheet for placing on a bottom surface of the battery unit 100 and for alleviating shocks and the like. As the rubber sheet portion 220, one rubber sheet is provided for three battery units 100 and eight rubber sheets are prepared to correspond to the 24 battery units 100.

The battery portion 230 is configured by combining the 24 battery units 100 in the configuration example of FIG. 12. In addition, as the battery portion 230, there is a connection configuration where a row block 231 is configured by three battery units 100 being connected in a row and eight row blocks 231 are connected in series.

The battery cover 240 is a cover for fixing the battery portion 230 and an opening portion is provided to correspond to the bus bar 120 of the non-aqueous electrolyte battery 50.

The fixed sheet 250 is arranged at an upper surface of the battery cover 240 and is a sheet which adheres to and fixes the battery cover 240 and the box cover 270 when the box cover 270 is fixed to the module case 210.

The electrical parts portion 260 has electrical parts such as a charge and discharge control circuit which controls the charging and discharging of the battery unit 100. The charge and discharge control circuit is arranged, for example, in a space between the bus bars 120 which are formed in two rows in the battery portion 230.

The box cover 270 is a cover for closing the module case 210 after each portion has been accommodated in the module case 210.

Here, in the battery module 200, the battery portion 230 is configured by the row blocks 231, where three battery units 100 are connected in a row, being connected in series, and the connection in series is performed using a metallic member of the electrical parts portion 260. Accordingly, in the battery portion 230, the row blocks 231 are each arranged so that the orientation of the terminals for each row block 231 alternate, that is, the plus terminals and the minus terminals of the adjacent row blocks 231 line up. Therefore, in the battery module 200, it is necessary to have a design where the lining up of terminals with the same poles in the adjacent row blocks 231 is prevented.

Figure 13:
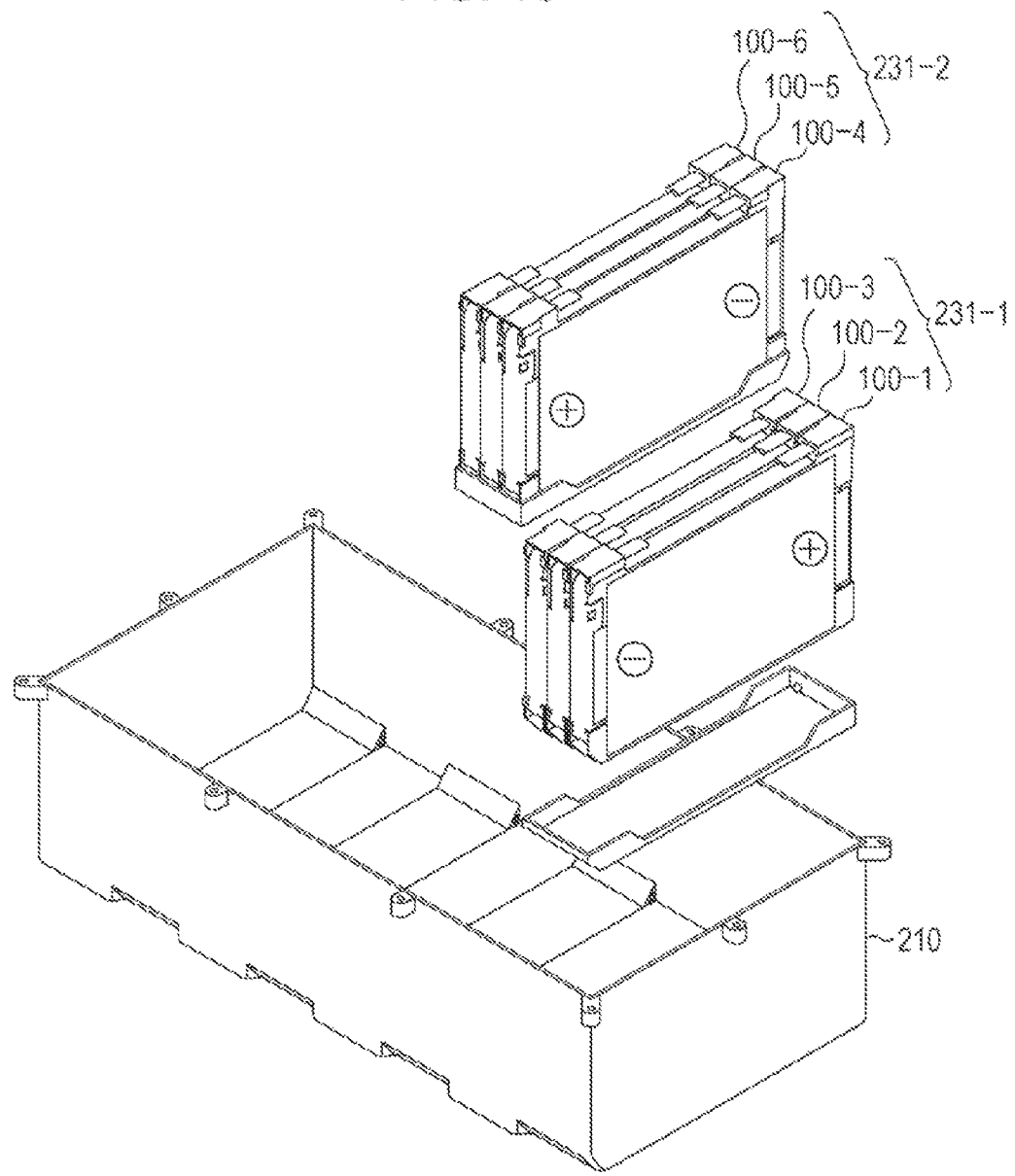
FIG. 13 is a perspective diagram illustrating a configuration of a battery module which uses a non-aqueous electrolyte battery according to an embodiment of the disclosure.
Figure 14A:
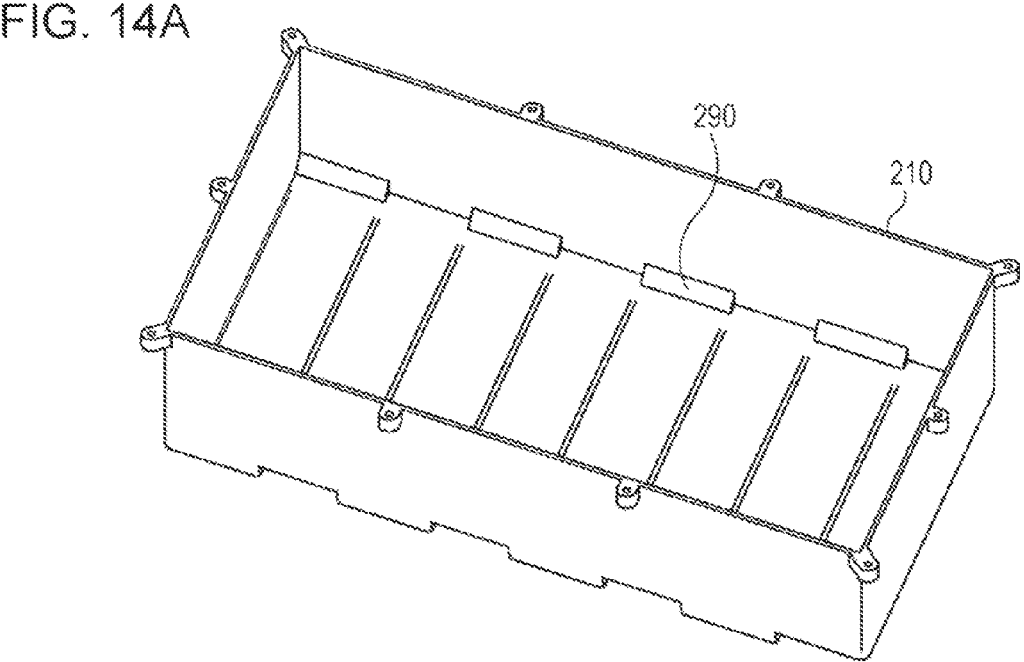
FIGS. 14A and 14B are perspective diagrams illustrating a configuration of a battery module which uses a non-aqueous electrolyte battery according to an embodiment of the disclosure.
Figure 14B:
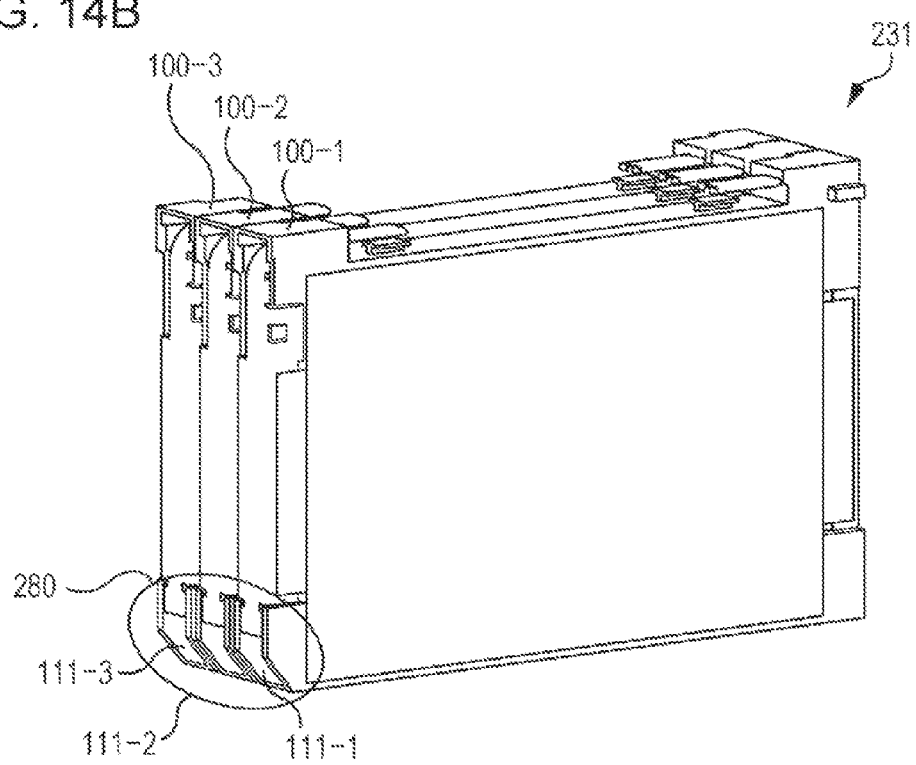
Figure 15A:
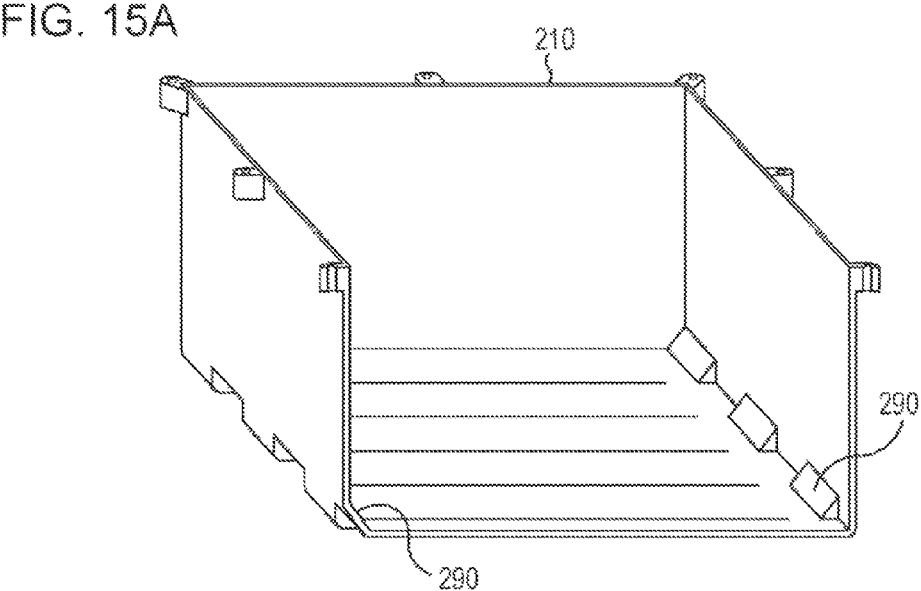
FIGS. 15A and 15B are perspective diagrams illustrating a configuration of a battery module which uses a non-aqueous electrolyte battery according to an embodiment of the disclosure.
Figure 15B:
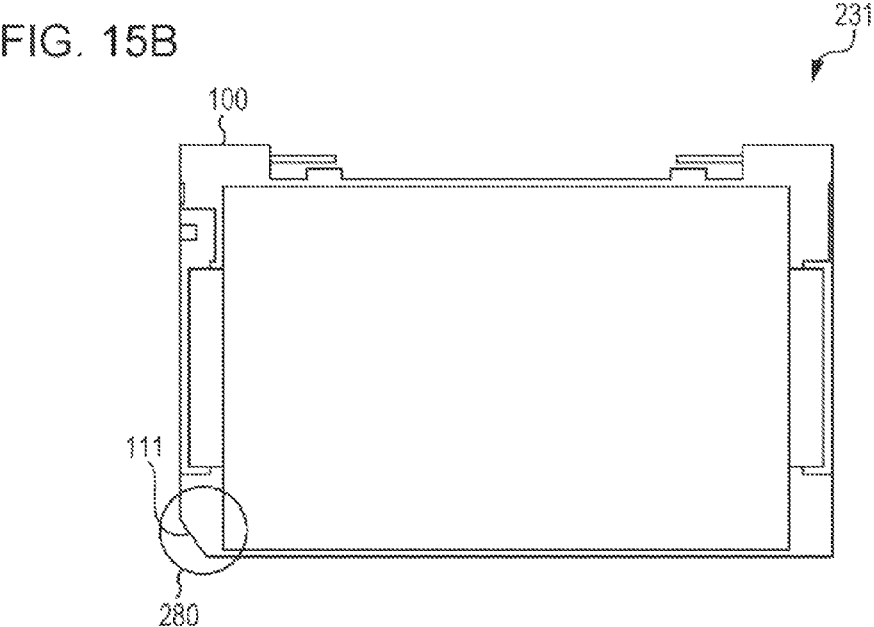

For example, as shown in FIG. 13, a row block 231-1 which is configured by battery units 100-1 to 100-3 and a row block 231-2 which is configured by battery units 100-4 to 100-6 are accommodated in the module case 210 in a position so that the plus terminals and the minus terminals are adjacent. In order to regulate to have this arrangement, the surface bevel portion 111, which is configured at one corner portion on a lower side of the bracket 110 of the battery unit 100, is used.

For example, as shown in FIGS. 14A to 15B, in the row block 231, a surface bevel region 280 is formed by grouping together the battery units 100-1 to 100-3 so that the surface bevel portions 111-1 to 111-3 face the same way. Then, in the module case 210, an inclined portion 290 is formed according to the inclination of the surface bevel region 280 and the inclined portion 290 is arranged to alternate with a length in accordance with the thickness of three non-aqueous electrolyte batteries 50.

In this manner, due to the surface bevel region 280 of the row block 231 and the inclined portion 290 of the module case 210, in a case where the row block 231 is to be accommodated in the module case 210 so as to face the wrong way, a corner portion of the bottom side of the row block 231 hits up against the inclined portion 290 of the module case 210. In this case, since the row block 231 is in a state of being suspended above the bottom surface of the module case 210, the row block 231 is not completely accommodated in the module case 210. Due to this, in the battery module 200, it is possible to prevent the adjacent lining up of terminals with the same poles in the adjacent row blocks 231.

The battery unit and the battery module which use the non-aqueous electrolyte battery of the disclosure are configured in this manner. Here, the battery unit and the battery module of the fifth embodiment are not limited to the embodiment described above and various modifications are possible based on the technical scope of the disclosure.

Here, it is possible that the non-aqueous electrolyte battery 50 of the disclosure and the battery module 200 which combines the non-aqueous electrolyte battery 50 may be used in electric power tools, electric cars, hybrid cars, electrically-powered bicycles, storage battery systems in households, building, or the like, and the like.

APPLIED EXAMPLES

Below, the disclosure will be described in further detail using applied examples. Here, the disclosure is not limited to the configuration of the applied examples.

Applied Example 1

A polyethylene terephthalate (PET) non-woven fabric with a thickness of 16 μm and air permeability of 0.3 sec./100 ml is used as a base. An inorganic particle layer formed from a laminated microporous film which includes alumina ($Al_2O_3$) particles is formed on both sides of the base. The inorganic particles are formed as described below.

A slurry, where 10 parts by mass of alumina particles with an average particle diameter of 0.6 μm, 1 part by mass of polyvinylidene fluoride (PVdF) with a weight-average molecular weight of approximately 1,000,000, and 33 parts by mass of N-methyl-2-pyrrolidone (NMP) as a solvent is mixed, is coated on one surface of the base with a thickness of 8 μm. After that, the base coated with the slurry is immersed in a water bath for 15 minutes and, after phase separation of the polyvinylidene fluoride, is dried using hot air. Next, the same slurry is coated on the other surface of the base with a thickness of 8 μm, the base is immersed in a water bath and, after phase separation of the polyvinylidene fluoride, is dried using hot air. Due to this, a separator before a calendar process is manufactured with a total thickness of 32 μm.

Here, when the manufactured separator before a calendar process is viewed using light microscopy at a magnification ratio of 500 times, holes are not able to be seen at all in the view.

Next, the separator of the applied example 1 is manufactured by a calendar process with a linear load of 20 kgf/cm being performed on the manufactured separator before a calendar process using a pressurizing device which is provided with mirror surface metal rollers.

When the total thickness of the separator after the calendar process is measured, it was 22 μm. In addition, the air permeability of the separator after the calendar process was 960 sec./100 ml. A visual appearance after the calendar process shows a slight gloss but there are no flaws or wrinkles Furthermore, the thickness at 20 points is measured at intervals of 2 cm in the MD direction and the variation in the separator thickness after the calendar process is calculated using a standard deviation. Then, when the proportion with regard to the separator thickness of the amount of variation (standard deviation) in the separator thickness after the calendar process which is expressed using a standard deviation is calculated as the variation in the separator thickness using the amount of variation (standard deviation) in the separator thickness, it was 1.7%.

Here, as will be described later, when the polyethylene terephthalate (PET) non-woven fabric with a thickness of 16 μm and air permeability of 0.3 sec./100 ml which is used as the base is subject to the calendar process under the same conditions, a reduction in thickness of approximately 2 μm is seen. As a result, the amount of reduction in the thickness of the inorganic particle layer due to the calendar process is estimated at 8 μm from (total thickness before calendar process 32 μm)–(total thickness after calendar process 22 μm)–(amount of reduction in base after calendar process 2 μm). When considering that there is even compression on both surfaces, the amount of reduction in the thickness of one side of the inorganic particle layer due to the calendar process is 4 μm and it is understood that the thickness of the inorganic particle layer is reduced by half compared to before the calendar process.

This has the meaning that the volume density of the coating film doubled from the point of view of film density. That is, it may be considered that it is equivalent to a doubling of the fineness of the inorganic particle layer. That the air permeability of the separator after the calendar process increased to 960 sec./100 ml provides support for this.

Applied Example 2

A separator is manufactured where an inorganic particle layer is formed on both surfaces of the base in the same manner as the applied example 1 except for the condition of the calendar process is a linear load of 80 kgf/cm When the total thickness of the separator after the calendar process is measured, it was 20 μm. In addition, the air permeability of the separator after the calendar process was 1100 sec./100 ml. Furthermore, the variation in the separator thickness after the calendar process is calculated using a standard deviation, and when the variation in the separator thickness after the calendar process is calculated, it was 1.4%.

Comparative Example 1

A separator is manufactured where an inorganic particle layer is formed on both surfaces of the base in the same manner as the applied example 1 except for the calendar process is not performed.

When the total thickness of the separator is measured, it was 32 μm. In addition, the air permeability of the separator was 570 sec./100 ml. Furthermore, the variation in the separator thickness is calculated using a standard deviation, and when the variation in the thickness of the separator where the calendar process is not performed is calculated, it was 2.6% and the variation in the thickness at each measurement point is large.

Comparative Example 2

A slurry, where 1 part by mass of polyvinylidene fluoride (PVdF) with a weight-average molecular weight of approximately 1,000,000 and 33 parts by mass of N-methyl-2-pyrrolidone (NMP) as a solvent is mixed without adding alumina particles when forming the slurry, is coated on each surface of the base with a thickness of 1 μm and a separator before the calendar process is manufactured with a total thickness of 18 μm. Except for this, the separator is manufactured where a PVdF layer which does not include alumina is formed on both surfaces of the base in the same manner as the applied example 1.

When the total thickness of the separator after the calendar process is measured, it was 15 μm. In addition, the air permeability of the separator was 1500 sec./100 ml. Furthermore, when the variation in the separator thickness after the calendar process is calculated using a standard deviation, it was 2.6% and the variation in the thickness at each measurement point is large.

In a case where the surface layers are only polyvinylidene fluoride, since it is easily compressed in comparison to the inorganic particle layer which includes alumina particles, the permeability is increased. In addition, in the layer with only resin, the variation in thickness is large since there is a tendency to trace the surface shape of the non-woven fabric.

Comparative Example 3

A separator formed from PET non-woven fabric where the calendar process is carried out is manufactured in the same manner as the applied example 1 except that the inorganic particles layer is not formed on both surface of the base When the total thickness of the separator after the calendar process is measured, it was 14 μm. In addition, the air permeability of the separator after the calendar process was 12 sec./100 ml, and there is a slight reduction in air permeability due to the closed holes being formed as the holes are flattened. Here, the reduction in the air permeability is a level which is able to be ignored from a practical point of view. Furthermore, when the variation in the separator thickness after the calendar process is calculated, it was 4.9% and the variation in the thickness at each measurement point is large. In addition, in comparison to comparative example 1, in a case where the inorganic particle layer is just provided on the base formed from PET non-woven fabric, since the inorganic particles follow the film thickness of the PET non-woven fabric, making the film thickness uniform is difficult and in a case where the calendar process is not performed, the film thickness is less uniform.

Comparative Example 4

With regard to a polyethylene (PE) microporous film with a thickness of 16 μm and air permeability of 310 sec./100 ml, a calendar process is performed with the same conditions as the applied example 1 and a separator of the comparative example 4 is manufactured. The holes in the polyethylene (PE) microporous film are formed by drawing a polyethylene film.

When the total thickness of the separator after the calendar process is measured, it was 11 μm. In addition, the air permeability of the separator after the calendar process was 4500 sec./100 ml. The visual appearance of the separator which is PE microporous film before a calendar process is white and not transparent, and on the other hand, the visual appearance of the separator of the comparative example 3 after a calendar process is transparent. It is considered that if the air permeability is significantly increased, the holes of the separator of the comparative example 3 are closed by the calendar process.

Comparative Example 5

A separator is manufactured where an inorganic particle layer is formed on both surfaces of the base in the same manner as the applied example 1 except for the separator before a calendar process is manufactured with a total thickness of 22 μm by using the polyethylene (PE) microporous film used in the comparative example 4 as the base instead of the non-woven fabric and coating 3 μm of the slurry on each on the surfaces of the base.

When the total thickness of the separator after the calendar process is measured, it was 17 μm. In addition, the air permeability of the separator after the calendar process was 4100 sec./100 ml. Even if the inorganic particle layer is formed, it is considered that the polyethylene microporous film is flattened by the calendar process and the holes are flattened and closed in the same manner as the comparative example 4.

[Evaluation of Separator]

Each of the separators manufactured as described above is evaluated using each of the tests described below.

(a) Heat Resistance Test

In regard to the separators of each of the applied examples and the comparative examples, thermal shrinkage in the MD (Machine Direction) direction and the TD (Transverse Direction) direction is measured. The measurement of the thermal shrinkage is holding a sample where predetermined dimensions are cut out in a thermostated chamber which is adjusted to 150° C. for one hour. After that, the sample was removed and the length of the sample after cooling to room temperature is measured. The size of the sample is measured in the MD direction and the TD direction.

Next, shrinkage is calculated in the MD direction and the TD direction using the equation below.

Shrinkage [%]=[{Length Before Heating−Length After Heating}/Length Before Heating]×100

(b) Tension Test

In regard to the separators of each of the applied examples and the comparative examples, the tension strength and the breaking elongation is measured. The tension strength [N/m] uses a sample which is cut out in a dumbbell shape with a width of 4 mm by a testing unit. The tension strength is measured by the sample being clamped using a clamp with a 30 mm length in a tension testing device (Autograph TCE-N300 manufactured by Shimadzu Corporation) which is based on standard number JIS B7721 in the JIS standard. In addition, the measurement of the breaking elongation is confirmed using a method which is based on standard number JIS K7113 in the JIS standard. The breakage elongation calculates the elongation when the sample breaks in the tension test from the equation below.

Breakage Elongation [%]=(Length $L$ of Sample at Breakage−Initial Length of Sample $L_0$)/Initial Length of Sample $L_0$×100

(c) Puncture Strength Test

The separators of each of the applied examples and the comparative examples are fixed and a needle with a half spherical shape which has a diameter of 1.0 mm and a tip radius of 0.5 mm punctures the surface of the separator at a speed of 100 mm/sec and the load when the needle penetrates is measured.

Here, since the comparative example 4 and the comparative example 5 are considered to have closed holes as described above and are considered to be poor in terms of practical value as a separator, each of the tests described above is not carried out on the comparative example 4 and the comparative example 5.

Table shows the evaluation results.

structure of the base and the inorganic particle layer and where the calendar process was performed showed higher strength in both the MD direction and the TD direction.

TABLE

| | Substrate | | | Inorganic Particles | | Separator | | | |
|---|---|---|---|---|---|---|---|---|---|
| | | | Air | | Average Particle | Thickness | Calendar Process | | |
| | Material | Thickness [μm] | Permeability [sec./100 ml] | Resin Material | Inorganic Particles | Diameter of Inorganic particles [μm] | of One Surface [μm] | Thickness Before Process [μm] | Pressure [kgf/cm] | Thickness After Process [μm] |
| Applied Example 1 | PET Non-Woven Fabric | 16 | 0.3 | PVdF | Alumina | 0.6 | 8 | 32 | 20 | 22 |
| Applied Example 2 | PET Non-Woven Fabric | 16 | 0.3 | PVdF | Alumina | 0.6 | 8 | 32 | 80 | 20 |
| Comparative Example 1 | PET Non-Woven Fabric | 16 | 0.3 | PVdF | Alumina | 0.6 | 8 | 32 | — | — |
| Comparative Example 2 | PET Non-Woven Fabric | 16 | 0.3 | PVdF | — | — | 1 | 18 | 20 | 15 |
| Comparative Example 3 | PET Non-Woven Fabric | 16 | 0.3 | — | — | — | — | 16 | 20 | 14 |
| Comparative Example 4 | PE Separator | 16 | 310 | — | — | — | — | 16 | 20 | 11 |
| Comparative Example 5 | PE Separator | 16 | 310 | PVdF | Alumina | 0.6 | 3 | 22 | 20 | 17 |

| | Separator | | | | | | | | |
|---|---|---|---|---|---|---|---|---|---|
| | Air Permeability [sec./100 ml] | Variation in Thickness [%] | Shrinkage [%] | | Tension Strength [N/m] | | Breakage Elongation [%] | | Puncture Strength [N] |
| | | | MD Direction | TD Direction | MD Direction | TD Direction | MD Direction | TD Direction | |
| Applied Example 1 | 960 | 1.7 | 0 | 0 | 1800 | 380 | 59 | 24 | 4.0 |
| Applied Example 2 | 1100 | 2.4 | 0 | 0 | 1880 | 390 | 31 | 27 | 4.1 |
| Comparative Example 1 | 570 | 2.6 | 0 | 0 | 1700 | 370 | 27 | 20 | 3.5 |
| Comparative Example 2 | 1500 | 2.6 | −1.0 | 0 | 1750 | 370 | 27 | 20 | 3.5 |
| Comparative Example 3 | 12 | 4.9 | −1.4 | 0 | 1020 | 210 | 14 | 8 | 3.1 |
| Comparative Example 4 | 4500 | — | — | — | — | — | — | — | — |
| Comparative Example 5 | 4100 | — | — | — | — | — | — | — | — |

As is understood from Table, with regard to the comparative example 2 and the comparative example 3 where the separator was not provided with the inorganic particle layer, the sample shrunk and the size was smaller after heating with shrinkage of −1.0% and −1.4% respectively in the MD direction. On the other hand, with regard to the applied example 1, the applied example 2 and the comparative example 1 where the separator was provided with the inorganic particle layer, the shrinkage in both the MD direction and the TD direction was below the limits for measurement (zero) for both the applied example 1 and the applied example 2 where the calendar process was performed and the comparative example 1 where the calendar process was not performed, and there was no negative effect on the heat resistance due to the calendar process.

In regard to the tension strength, compared to the comparative example 1 where the inorganic particle layer was formed but the calendar process was not performed, the comparative example 2 where the alumina particles were not added, and after the formation of only the resin layer, the calendar process was performed, and the comparative example 3 where the inorganic particle layer was not provided, each of the applied examples which have a laminate With regard to the breakage elongation and the puncture strength, the applied examples shows higher values compared to each of the comparative examples in the same manner as the tension strength.

Above, the embodiments and applied examples of the disclosure are described, but the disclosure is not limited by these and various modifications are possible within the scope of the concept of the disclosure. For example, in a case where the microporous film is used as the battery separator, the thickness of the separator and the composition of each of the materials may be set in combination with the configuration of the positive electrode and the negative electrode.

In addition, the battery described in the second embodiment is one example and it is possible that the laminated microporous film of the disclosure is used in various types of batteries such as cylindrical types, square types, laminated types, coin-shaped types, or the like.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A laminated microporous film comprising:
   a base which is formed from a non-woven fabric; and
   a surface layer which is formed on at least one of the surfaces of the base and includes a resin material and inorganic particles,
   wherein variation in thickness using a standard deviation is equal to or less than 1.7% of the laminated microporous film, air permeability is equal to or greater than 960 sec/100 ml and is equal to or less than 1100 sec/100 ml, and a portion of the surface layer is provided into holes of the non-woven fabric, after a film thickness uniforming process is performed on the laminated microporous film, and wherein pressure during the film thickness uniforming process is a linear load equal to or greater than 20 kgf/cm and equal to or less than 200 kgf/cm.

2. The laminated microporous film according to claim 1, wherein the resin material includes polyvinylidene fluoride.

3. The laminated microporous film according to claim 2, wherein the resin material has a three-dimensional mesh structure.

4. The laminated microporous film according to claim 1, wherein the mass ratio of the inorganic particles to the resin material in the surface layer is within the range of 5:1 to 12:1.

5. The laminated microporous film according to claim 4, wherein the inorganic particles are formed from at least one type of alumina ($Al_2O_3$), titania ($TiO_2$) which has a rutile structure, or silica ($SiO_2$).

6. A laminated microporous film comprising:
   a base which is formed from a non-woven fabric; and
   a surface layer which is formed on at least one of the surfaces of the base and includes a resin material and inorganic particles,
   wherein the laminated microporous film is formed by a pressurizing process being carried out on at least one of the surfaces of the surface layer, variation in thickness using a standard deviation is equal to or less than 1.7% of the laminated microporous film, air permeability is equal to or greater than 960 sec/100 ml and is equal to or less than 1100 sec/100 ml, and a portion of the surface layer is provided into holes of the non-woven fabric, after the pressurizing process, and wherein pressure during the pressurizing process is a linear load equal to or greater than 20 kgf/cm and equal to or less than 200 kgf/cm.

7. The laminated microporous film according to claim 6, wherein the pressurizing process is a calendar process.

8. The laminated microporous film according to claim 6, wherein variation in thickness which is expressed using a standard deviation is equal to or less than 2.5% of the laminated microporous film.

9. A separator comprising:
   a base which is formed from a non-woven fabric; and
   a surface layer which is formed on at least one of the surfaces of the base and includes a resin material and inorganic particles,
   wherein variation in thickness using a standard deviation is equal to or less than 1.7% of the separator, air permeability is equal to or greater than 960 sec/100 ml and is equal to or less than 1100 sec/100 ml, and a portion of the surface layer is provided into holes of the non-woven fabric, after a film thickness uniforming process is performed on the separator, and wherein pressure during the film thickness uniforming process is a linear load equal to or greater than 20 kgf/cm and equal to or less than 200 kgf/cm.

10. A separator comprising:
    a base which is formed from a non-woven fabric; and
    a surface layer which is formed on at least one of the surfaces of the base and includes a resin material and inorganic particles,
    wherein the separator is formed by a pressurizing process being carried out on at least one of the surfaces of the surface layer, variation in thickness using a standard deviation is equal to or less than 1.7% of the separator, air permeability is equal to or greater than 960 sec/100 ml and is equal to or less than 1100 sec/100 ml, and a portion of the surface layer is provided into holes of the non-woven fabric, after the pressurizing process, and wherein pressure during the pressurizing process is a linear load equal to or greater than 20 kgf/cm and equal to or less than 200 kgf/cm.

11. A non-aqueous electrolyte battery comprising:
    a positive electrode;
    a negative electrode;
    a separator; and
    a non-aqueous electrolyte,
    wherein the separator is provided with a base which is formed from a non-woven fabric, and a surface layer which is formed on at least one of the surfaces of the base and includes a resin material and inorganic particles, variation in thickness using a standard deviation is equal to or less than 1.7% of the separator, air permeability is equal to or greater than 960 sec/100 ml and is equal to or less than 1100 sec/100 ml, and a portion of the surface layer is provided into holes of the non-woven fabric, after a film thickness uniforming process is performed on the separator, and wherein pressure during the film thickness uniforming process is a linear load equal to or greater than 20 kgf/cm and equal to or less than 200 kgf/cm.

12. A non-aqueous electrolyte battery comprising:
    a positive electrode;
    a negative electrode;
    a separator; and
    a non-aqueous electrolyte,
    wherein the separator is provided with a base which is formed from a non-woven fabric, and a surface layer which is formed on at least one of the surfaces of the base and includes a resin material and inorganic particles, the separator is formed by a pressurizing process being carried out on at least one of the surfaces of the surface layer, variation in thickness using a standard deviation is equal to or less than 1.7% of the separator, air permeability is equal to or greater than 960 sec/100 ml and is equal to or less than 1100 sec/100 ml, and a portion of the surface layer is provided into holes of the non-woven fabric, after the pressurizing process, and wherein pressure during the pressurizing process is a linear load equal to or greater than 20 kgf/cm and equal to or less than 200 kgf/cm.

13. The non-aqueous electrolyte battery according to claim 12, wherein the pressurizing process is a calendar process.

14. The non-aqueous electrolyte battery according to claim 12, wherein variation in thickness which is expressed using a standard deviation is equal to or less than 2.5% of the separator.

15. The laminated microporous film according to claim 1, wherein the inorganic particles are formed from alumina ($Al_2O_3$).

16. The laminated microporous film according to claim 1, wherein the non-woven fabric includes polyethylene terephthalate, wherein the resin material includes polyvinylidene fluoride, and wherein the inorganic particles are formed from alumina ($Al_2O_3$).

17. The laminated microporous film according to claim 6, wherein the inorganic particles are formed from alumina ($Al_2O_3$).

18. The laminated microporous film according to claim 6, wherein the non-woven fabric includes polyethylene terephthalate, wherein the resin material includes polyvinylidene fluoride, and wherein the inorganic particles are formed from alumina ($Al_2O_3$).

* * * * *